(12) United States Patent
Panta et al.

(10) Patent No.: US 10,740,198 B2
(45) Date of Patent: Aug. 11, 2020

(54) PARALLEL PARTIAL REPAIR OF STORAGE

(71) Applicants: AT&T Intellectual Property I, L.P., Atlanta, GA (US); Purdue Research Foundation, West Lafayette, IN (US)

(72) Inventors: Rajesh Panta, Bridgewater, NJ (US); Moo-Ryong Ra, Bridgewater, NJ (US); Saurabh Bagchi, West Lafayette, IN (US); Subrata Mitra, Lafayette, IN (US)

(73) Assignees: Purdue Research Foundation, West Lafayette, IN (US); AT&T Intellectual Property I, L.P., Atlanta, GA (US)

(*) Notice: Subject to any disclaimer, the term of this patent is extended or adjusted under 35 U.S.C. 154(b) by 441 days.

(21) Appl. No.: 15/387,770

(22) Filed: Dec. 22, 2016

(65) Prior Publication Data

US 2018/0181471 A1 Jun. 28, 2018

(51) Int. Cl.
- *G06F 11/00* (2006.01)
- *G06F 11/16* (2006.01)
- *G06F 11/10* (2006.01)

(52) U.S. Cl.
CPC ...... *G06F 11/1662* (2013.01); *G06F 11/1076* (2013.01)

(58) Field of Classification Search
USPC .......................................................... 714/6.3
See application file for complete search history.

(56) References Cited

U.S. PATENT DOCUMENTS

| | | | |
|---|---|---|---|
| 7,599,326 B2 | 10/2009 | Watson | |
| 8,555,109 B2 | 10/2013 | Dhuse et al. | |
| 8,645,799 B2 | 2/2014 | Li et al. | |
| 8,868,647 B2 | 10/2014 | Naga et al. | |
| 9,098,447 B1 | 8/2015 | Donlan et al. | |
| 9,280,416 B1 | 3/2016 | Xin et al. | |
| 9,703,655 B1* | 7/2017 | Hardt | G06F 11/2058 |
| 10,289,507 B1* | 5/2019 | Malwankar | G06F 3/0635 |
| 2004/0128587 A1* | 7/2004 | Kenchammana-Hosekote | G06F 11/0727 714/43 |
| 2004/0215640 A1* | 10/2004 | Bamford | G06F 16/27 |
| 2007/0133420 A1 | 6/2007 | Guven et al. | |

(Continued)

FOREIGN PATENT DOCUMENTS

| | | |
|---|---|---|
| CN | 101630282 A | 1/2010 |
| CN | 103106124 A | 5/2013 |

(Continued)

OTHER PUBLICATIONS

Hu et al.; "NCCloud: Applying Network Coding for the Storage Repair in a Cloud-of-Clouds"; FAST; 2012; 8 pages.

(Continued)

*Primary Examiner* — Yair Leibovich
(74) *Attorney, Agent, or Firm* — BakerHostetler

(57) ABSTRACT

A reconstruction may be divided into a set of partial operations and scheduled in parallel using a distributed protocol which overlays a reduction tree to aggregate the results. In addition, a scheduling algorithm called multiple partial parallel repair is introduced for handling concurrent failures. Multiple reconstructions may be coordinated in parallel while working to minimize the conflict for shared resources.

20 Claims, 13 Drawing Sheets

(56) References Cited

U.S. PATENT DOCUMENTS

| | | | |
|---|---|---|---|
| 2010/0218037 A1 | 8/2010 | Swartz et al. | |
| 2011/0274406 A1* | 11/2011 | Kashiwagi | G06K 9/00711 |
| | | | 386/224 |
| 2013/0205113 A1* | 8/2013 | Ahmad | G06F 12/023 |
| | | | 711/170 |
| 2014/0074865 A1* | 3/2014 | Zobrist | G06Q 10/06 |
| | | | 707/749 |
| 2015/0236724 A1 | 8/2015 | Reinart | |
| 2015/0319226 A1* | 11/2015 | Mahmood | H04L 43/0817 |
| | | | 709/201 |
| 2016/0011935 A1 | 1/2016 | Luby | |
| 2016/0011936 A1 | 1/2016 | Luby | |
| 2016/0239380 A1 | 8/2016 | Wideman et al. | |
| 2017/0032645 A1* | 2/2017 | Shepherd | G08B 21/0213 |

FOREIGN PATENT DOCUMENTS

| | | |
|---|---|---|
| CN | 103561057 A | 2/2014 |
| CN | 103605582 A | 2/2014 |
| CN | 103607304 B | 8/2016 |
| EP | 1926329 A1 | 5/2008 |
| KR | 10-121786 B1 | 1/2013 |
| KR | 10-2014-0080919 A | 7/2014 |
| WO | WO 2013/191658 A1 | 12/2013 |
| WO | WO 2016/126202 A1 | 8/2016 |

OTHER PUBLICATIONS

Dimakis et al.; "Network Coding for Distributed Storage Systems"; IEEE Transactions on Information Theory; 56.9; 2010; 12 pages.

Demsky et al.; "Automatic Detection and Repair of Errors in Data Structure"; ACM SIGPLAN Notices; vol. 38 No. 11; 2003; 18 pages.

Weatherspoon et al.; "Erasure Coding vs. Replication: A Quantitative Comparison"; Int'l Workshop on Peer-to-Peer Systems; 2002; 6 pages.

Sathiamoorthy et al.; "XORing Elephants: Novel Erasure Codes for Big Data"; Proceedings of the VLDB Endowment; vol. 6 No. 5; 2013; 16 pages.

Rizzo; "Effective Erasure Codes for Reliable Computer Communication Protocols"; ACM SIGCOMM Computer Communication Review; 27.2; 1997; p. 24-36.

Greenberg et al.; "VI2: A Scalable and Flexible Data Center Network"; ACM SIGCOMM Computer Communication Review; vol. 39 Issue 4; Oct. 2009; p. 51-62.

Ford et al.; "Availability in Globally Distributed Storage Systems"; OSDI; 2010; 14 pages.

* cited by examiner

Case1: P2 is lost

$P_2 = a_{21}D_1 + a_{22}D_2 + a_{23}D_3 + a_{24}D_4$

Case2: D3 is lost

- Step 1: Create decoding matrix $H^{-1}$ $$\begin{pmatrix} e_{11} & e_{12} & e_{13} & e_{14} \\ e_{21} & e_{22} & e_{23} & e_{24} \\ e_{31} & e_{32} & e_{33} & e_{34} \\ e_{11} & e_{12} & e_{13} & e_{14} \end{pmatrix} = \begin{pmatrix} 1 & 0 & 0 & 0 \\ 0 & 1 & 0 & 0 \\ 0 & 0 & 1 & 0 \\ a_{11} & a_{12} & a_{13} & a_{14} \end{pmatrix}$$

- Step 2: Multiply relevant row of the decoding matrix by surviving chunks $D_3 = e_{31}D_1 + e_{32}D_2 + e_{33}D_4 + e_{34}P_1$

FIG. 11B $$\begin{pmatrix} 1 & 0 & 0 & 0 \\ 0 & 1 & 0 & 0 \\ 0 & 0 & 1 & 0 \\ 0 & 0 & 0 & 1 \\ a_{11} & a_{12} & a_{13} & a_{14} \\ a_{21} & a_{22} & a_{23} & a_{24} \end{pmatrix} \times \begin{pmatrix} D_1 \\ D_2 \\ D_3 \\ D_4 \end{pmatrix} = \begin{pmatrix} D_1 \\ D_2 \\ D_3 \\ D_4 \\ P_1 \\ P_2 \end{pmatrix}$$

G: Generator matrix    Data chunks    Data + parity chunks

FIG. 11A

PARALLEL PARTIAL REPAIR OF STORAGE

TECHNICAL FIELD

The technical field generally relates to storage, more specifically, to systems and methods for a data reconstruction technique.

BACKGROUND

A tremendous amount of data has been created in the past few years. Some studies show that 90% of world's data was created in the last two years. Not only are we generating huge amounts of data, but the pace at which the data is being created is also increasing rapidly. Along with this increase, there is also the user expectation of high availability of the data, in the face of occurrence of failures of disks or disk blocks. Replication is a commonly used technique to provide reliability of the stored data. However, replication makes data storage even more expensive because it increases the cost of raw storage by a factor equal to the replication count. For example, many practical storage systems (e.g., Hadoop Distributed File System (HDFS), Ceph, Swift, etc.) maintain three copies of the data, which increases the raw storage cost by a factor of three.

In recent years, erasure codes (EC) have gained favor and increasing adoption as an alternative to data replication because they incur significantly less storage overhead, while maintaining equal (or better) reliability. In a (k, m) Reed-Solomon (RS) code, the most widely used EC scheme, a given set of k data blocks, called chunks, are encoded into (k+m) chunks. The total set of chunks comprises a stripe. The coding is done such that any k out of (k+m) chunks are sufficient to recreate the original data. For example, in RS (4, 2) code, 4 MB of user data is divided into four 1 MB blocks. Then, two additional 1 MB parity blocks are created to provide redundancy. In case of a triple replicated system, all four 1 MB blocks are replicated three times. Thus, an RS (4, 2) coded system requires 1.5x bytes of raw storage to store x bytes of data and it can tolerate up to 2 data block failures. On the other hand, a triple replication system needs 3x bytes of raw storage and can tolerate the same number of simultaneous failures.

Although attractive in terms of reliability and storage overhead, a major drawback of erasure codes is the expensive repair or reconstruction process—when an encoded chunk (say c bytes) is lost because of a disk or server failure, in a (k, m) code system, k×c bytes of data need to be retrieved from k servers to recover the lost data. The term "server" refers to the machine that stores the replicated or erasure-encoded data or parity chunks. In the triple replicated system, on the other hand, since each chunk of c bytes is replicated three times, the loss of a chunk can be recovered by copying only c bytes of data from any one of the remaining replicas. This k-factor increase in network traffic causes reconstruction to be very slow, which is a critical concern for production data centers of reasonable size, where disk, server or network failures happen quite regularly, thereby necessitating frequent data reconstructions. In addition, long reconstruction time degrades performance for normal read operations that attempts to read the erasured data. During the long reconstruction time window, the probability of further data loss increases, thereby increasing the susceptibility to a permanent data loss. An erasure refers to loss, corruption, and unavailability of data or parity chunks.

While it is important to reduce repair traffic, practical storage systems also need to maintain a given level of data reliability and storage overhead. Using erasure codes that incur low repair traffic at the expense of increased storage overhead and inferior data reliability is therefore usually a non-starter. However, reducing repair traffic without negatively impacting storage overhead and data reliability is a challenging task. It has been shown theoretically that there exists a fundamental tradeoff among data reliability, storage overhead, volume of repair traffic, and repair degree. Dimakis et al. (Network coding for distributed storage systems. IEEE Transactions on Information Theory, 2010) provide a mathematical formulation of an optimal tradeoff curve that answers the following question—for a given level of data reliability (i.e., a given (k, m) erasure coding scheme), what is the minimum repair traffic that is feasible while maintaining a given level of storage overhead? At one end of this optimal curve lies a family of erasure codes called Minimum Storage Codes that require minimum storage overhead, but incur high repair bandwidth. At another end of the spectrum lies a set of erasure codes called Minimum Bandwidth Codes that require optimal repair traffic, but incur high storage overhead and repair degree. Existing works fall at different points of this optimal tradeoff curve. For example, RS codes, popular in many practical storage systems, require minimum storage space, but create large repair traffic. Locally repairable codes require less repair traffic, but add extra parity chunks, thereby increasing the storage overhead.

SUMMARY

Disclosed herein are systems, methods, and apparatuses that enable a repair technique called Partial Parallel Repair (PPR) that divides a data reconstruction operation into small partial operations and schedules them on multiple nodes already involved in the data reconstruction. Then a distributed protocol progressively combines these partial results to reconstruct the unavailable data blocks.

Additional approaches discussed in more detail herein are systems, methods, and apparatuses for reconstruction, such as: a) a caching scheme for reducing IO read time and b) a scheduling scheme targeted for multiple simultaneous reconstruction operations. Also discussed in more detail herein are systems, methods, and apparatuses for overlaying PPR on previous sophisticated codes beyond Reed-Solomon, such as locally repairable code (LRC) and rotated-RS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

FIG. 11A illustrates conventional RS (4, 2) encoding.

FIG. 11B illustrates conventional RS (4, 2) reconstruction.

DETAILED DESCRIPTION

With the explosion of data in applications all around us, erasure coded storage has emerged as an attractive alternative to replication because even with significantly lower storage overhead, they provide better reliability against data loss. Reed-Solomon code is the most widely used erasure code (EC) because it provides maximum reliability for a given storage overhead and is flexible in the choice of coding parameters that determine the achievable reliability. However, reconstruction time for unavailable data becomes prohibitively long, mainly because of network bottlenecks. Some conventional solutions either use additional storage or limit the coding parameters that can be used.

Disclosed herein is a distributed reconstruction technique, called Partial Parallel Repair (PPR), which, in summary, divides the reconstruction operation to small partial operations and schedules them on multiple nodes that are involved in the data reconstruction. Then a distributed protocol progressively may combine these partial results to reconstruct the unavailable data blocks. PPR reduces the network pressure. PPR may complete the network transfer in $\lceil (\log_2(k+1)) \rceil$ time, compared to k time needed for a (k, m) Reed-Solomon code. Experiments have shown that PPR reduces repair time and degraded read time significantly. Moreover, PPR is compatible with existing erasure codes and does not require additional storage overhead. Overlaying PPR on top of two prior schemes, Local Reconstruction Code and Rotated Reed-Solomon code as provided herein, demonstrates compatibility and savings in reconstruction time.

Figure 1:
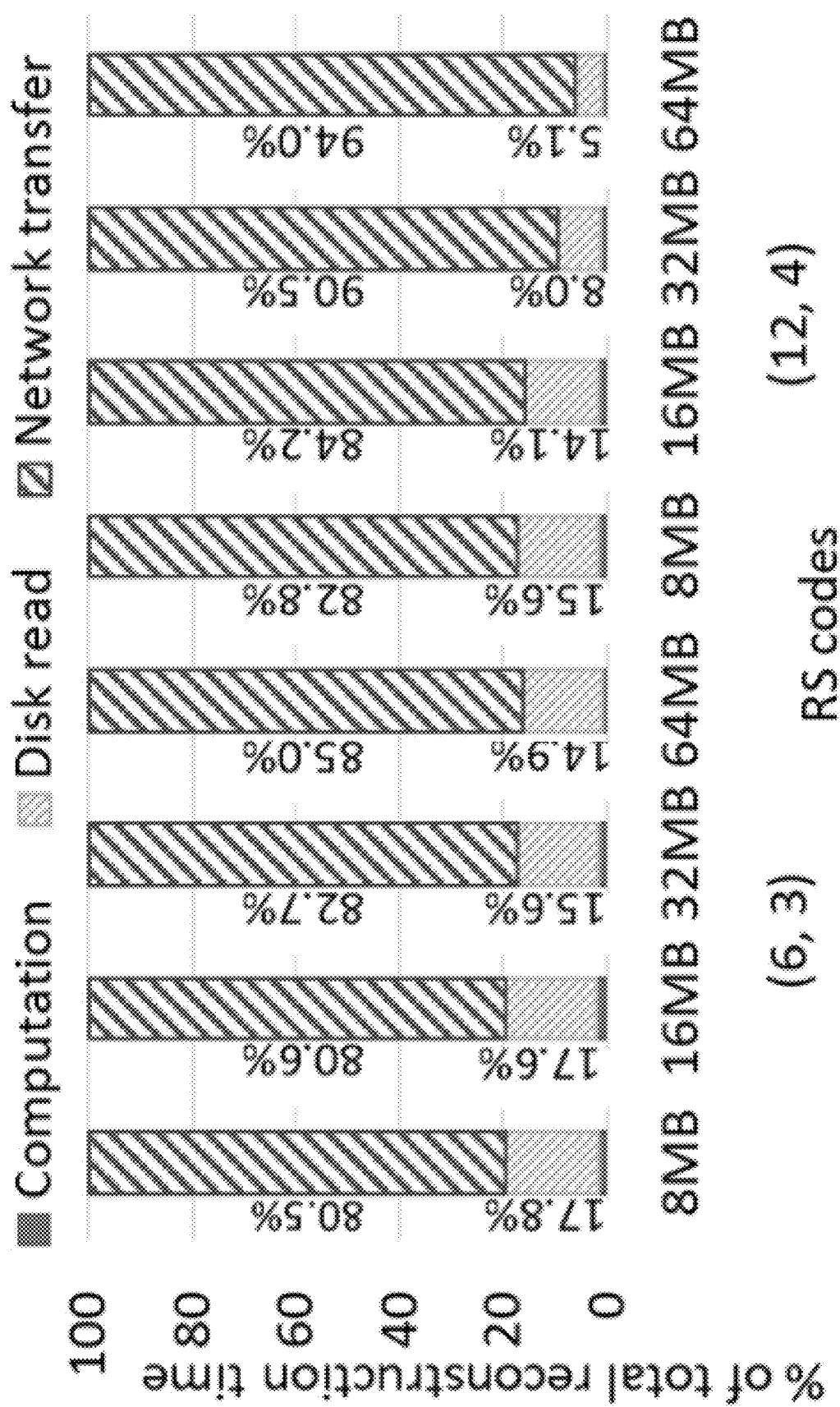
FIG. 1 illustrates a graph with Percentage of time taken by different phases during a degraded read using traditional RS reconstruction technique.

A significant reason why reconstruction is slow in EC systems is the poor utilization of network resources during reconstruction. FIG. 1 illustrates a percentage of time taken by different phases during a degraded read using traditional Reed-Solomon (RS) reconstruction technique. A reconstruction of the failed chunk requires a repair server to fetch k chunks (belonging to the same stripe as the failed chunk) from k different servers. This causes the network link into the repair server to become congested, increasing the network transfer time. The measurements in exemplary clusters show that network transfer time constitutes up to 94% of the entire reconstruction time, as illustrated in FIG. 1. Other researchers have also reported similar results.

Figure 2A:
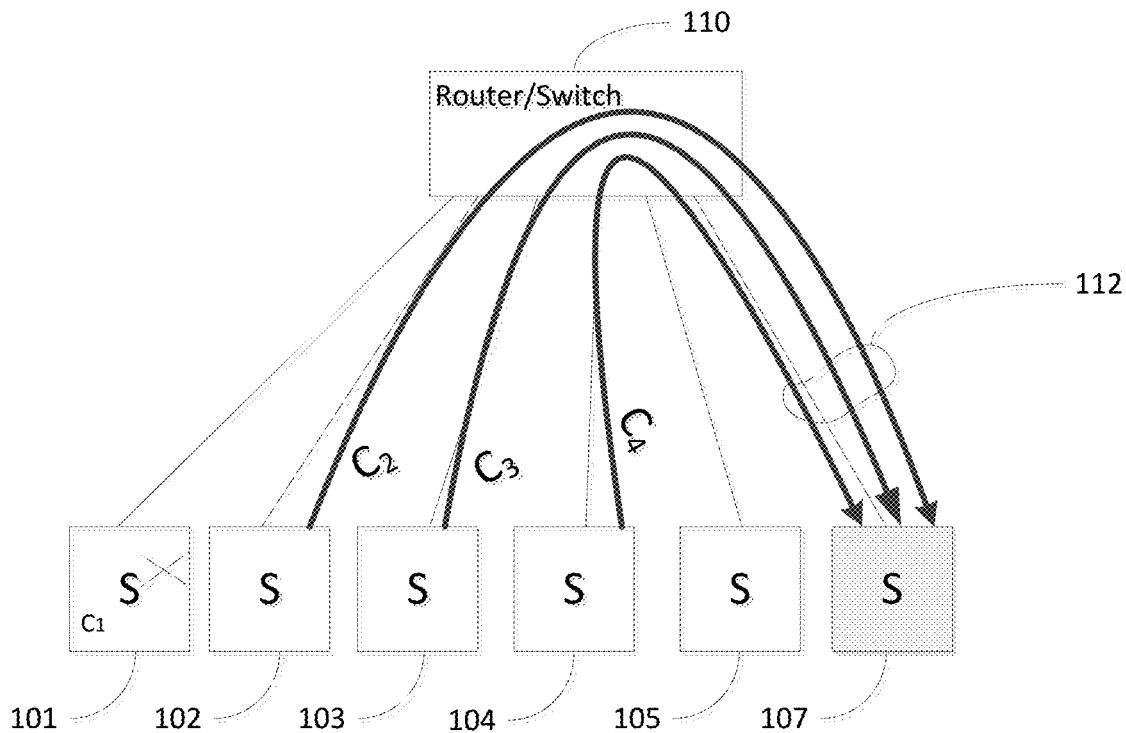
FIG. 2A illustrates an exemplary data transfer pattern for conventional reconstruction for RS (3, 2) code.
Figure 2B:
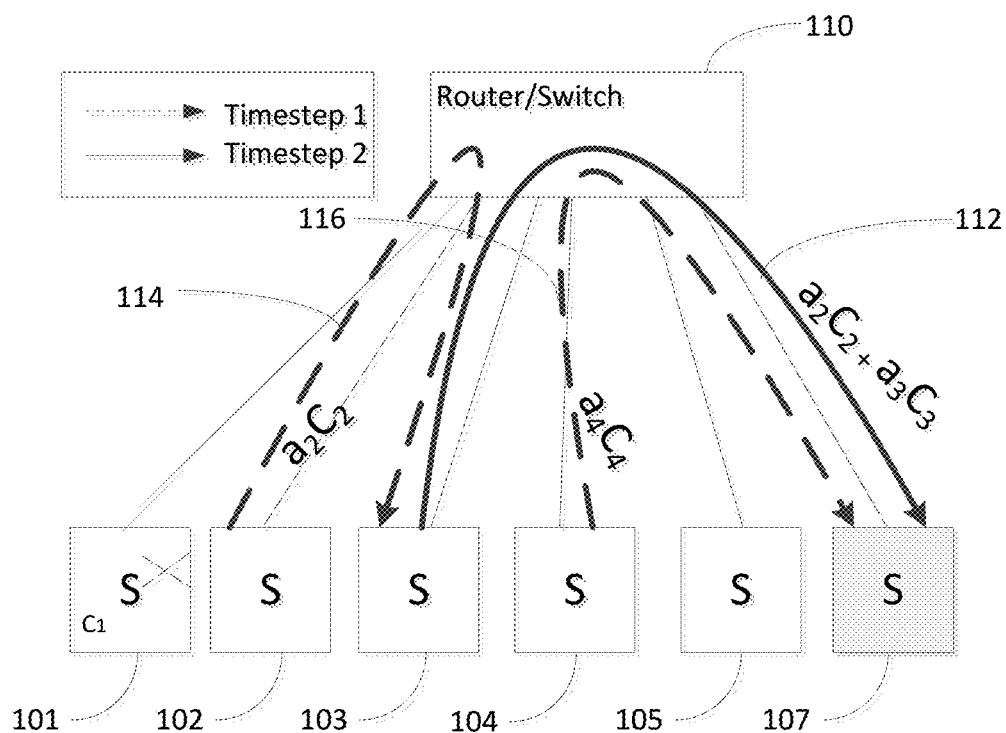
FIG. 2B illustrates an exemplary data transfer pattern for PPR reconstruction for RS (3, 2) code.

FIG. 2A and FIG. 2B provide a comparison of data transfer patterns between traditional reconstruction of FIG. 2A and PPR reconstruction of FIG. 2B for RS (3, 2) code. C2, C3, etc. are the chunks hosted by the servers. When server 101 fails, server 107 becomes the repair destination. Network link 112 to server 107 is congested during traditional repair as shown in FIG. 2A. Network link 112 into the repair server (server 107) is three times more congested than network links to other servers. PPR addresses this problem by redistributing the reconstruction traffic more uniformly across the existing network links, thereby improving the utilization of network resources and decreasing reconstruction time. In order to redistribute the reconstruction traffic, instead of centralizing reconstruction in a single reconstruction server, PPR divides reconstruction into several partial parallel repair operations that are performed about or at the same time at multiple servers, as shown in FIG. 2B. Then these results from partial computation are collected using a tree-like overlay network. By splitting the repair operation among multiple servers, PPR removes the congestion in the network link of the repair server and redistributes the reconstruction traffic more evenly across the existing network links. Theoretically, PPR may complete the network transfer for a single chunk reconstruction in approximately $O(\log_2(k))$ time, compared to $O(k)$ time needed for a (k, m) RS code. Table 1 shows expected reduction in network transfer time during reconstruction for typical erasure coding parameters used in practical systems, as well as maximum bandwidth requirement per server. Although PPR may not reduce the total amount of data transferred during reconstruction, it may reduce reconstruction time significantly by distributing data transfers across network links.

TABLE 1

| Code params | Users | Possible reduction in network transfer | Possible reduction in maximum BW usage/server |
|---|---|---|---|
| (6, 3) | QFS, FS | 50% | 50% |
| (8, 3) | Object Store | 50% | 62.5% |
| (10, 4) | HDFS | 60% | 60% |
| (12, 4) | Azure | 66.6% | 66.6% |

In considering the effect of a scheme on reconstruction of missing chunks in an EC system, at least two different kinds of reconstruction may be considered. The first is called regular repair or proactive repair, in which a monitoring daemon proactively detects that a chunk is missing or erroneous and triggers reconstruction. The second is called degraded read, in which a client tries to read a lost data chunk that has not been repaired yet and then has to perform reconstruction in the critical path. PPR achieves a significant reduction in times for both these kinds of reconstruction. Degraded reads are significant for practical storage systems because degraded read operations happen quite often, more frequently than regular repairs. Transient errors amount to 90% of data center failures, because of issues like rolling software updates, operating system issues, and non-disk system failures. In these cases, actual repairs are not necessary, but degraded reads are inevitable since client requests can happen during the transient failure period. Furthermore, many practical systems delay the repair operation to avoid initiating costly repair of transient errors.

PPR introduces a load-balancing approach to further reduce the reconstruction time when multiple concurrent requests are in progress. Herein, this is called variant m-PPR. When selecting k servers out of (k+m) available servers for reconstruction, PPR may deliberately choose those servers that have already cached the data in memory; thereby avoiding the time-consuming disk IO on such servers. The m-PPR protocol tries to schedule the simultaneous reconstruction of multiple stripes in such a way that the network traffic is evenly distributed among existing servers. More details about m-PPR are provided herein.

Additional approaches discussed in more detail below are optimization methods to further reduce reconstruction time: a) a caching scheme for reducing IO read time and b) a scheduling scheme targeted for multiple simultaneous reconstruction operations.

Also discussed in more detail below are methods and systems of how PPR may be overlaid on previous sophisticated codes beyond Reed-Solomon, such as LRC and rotated-RS. PPR may provide an additional 19% and 35% reduction in reconstruction time, respectively, over and above the aforementioned LRC and rotated-RS codes.

Discussed below is efficient single chunk reconstruction with regard to PPR. As discussed herein, to reconstruct an erasured chunk, the EC storage system gathers k other chunks and performs an appropriate computation. This step often incurs high latency because of the large volume of data transfer over a particular link, namely, the one leading to the final destination, which becomes the bottleneck. Based on the repair operation of RS code, the following two observations may be made with regard to the design of PPR. First, the actual reconstruction equation used for computing the missing chunks (e.g., data or parity), as shown in FIG. 11B, is linear and the XOR operations (e.g., the additions) over the terms are associative. Second, the multiplication by the scalar decoding coefficients or a XOR between two terms do not increase the size of the data. Thus, the size of all the terms that would be XORed, as well as the size of the final reconstructed chunk, is the same as the size of the original chunks that were retrieved from different servers. For instance, let $R=a_1C_1+a_2C_2$ be the equation for reconstruction. Here $a_1$, $a_2$ are the decoding coefficients and R denotes a missing chunk that will be reconstructed from the existing chunks $C_1$ and $C_2$. All individual terms in the above equation, e.g., $C_1$, $C_2$, $a_1C_1$, and $a_2C_2$, will have the same volume of data which is equal to the chunk size (e.g. 64 MB).

Note that the following occurs during reconstruction, in an example we have A, B, C, and D, which each are 100 bytes. We combine A+B=s1 and C+D=s2. In this case A+B=100 bytes (not 200 bytes) and C+D=100 bytes (not 200 bytes). So the node that is doing final repairs only gets 200 bytes (s1+s2). In the conventional case, the final node would get 400 bytes. We are also saving time, as discussed, but we are also load balancing. Load balancing across network links is a desirable requirement in data centers. As discussed herein, load balancing may be done across network links.

The aforementioned two observations may be significant considerations in the design of PPR, which may include 1) distributing the repair operation over a number of servers that only computes a partial result locally and in parallel, and 2) then forwarding the intermediate result to the next designated server en route to the final destination. The servers involved in the distributed operations may be the ones that host the surviving chunks of that stripe. The host design allows for the part of the data needed for reconstruction to be already available locally on a server.

Figure 3:
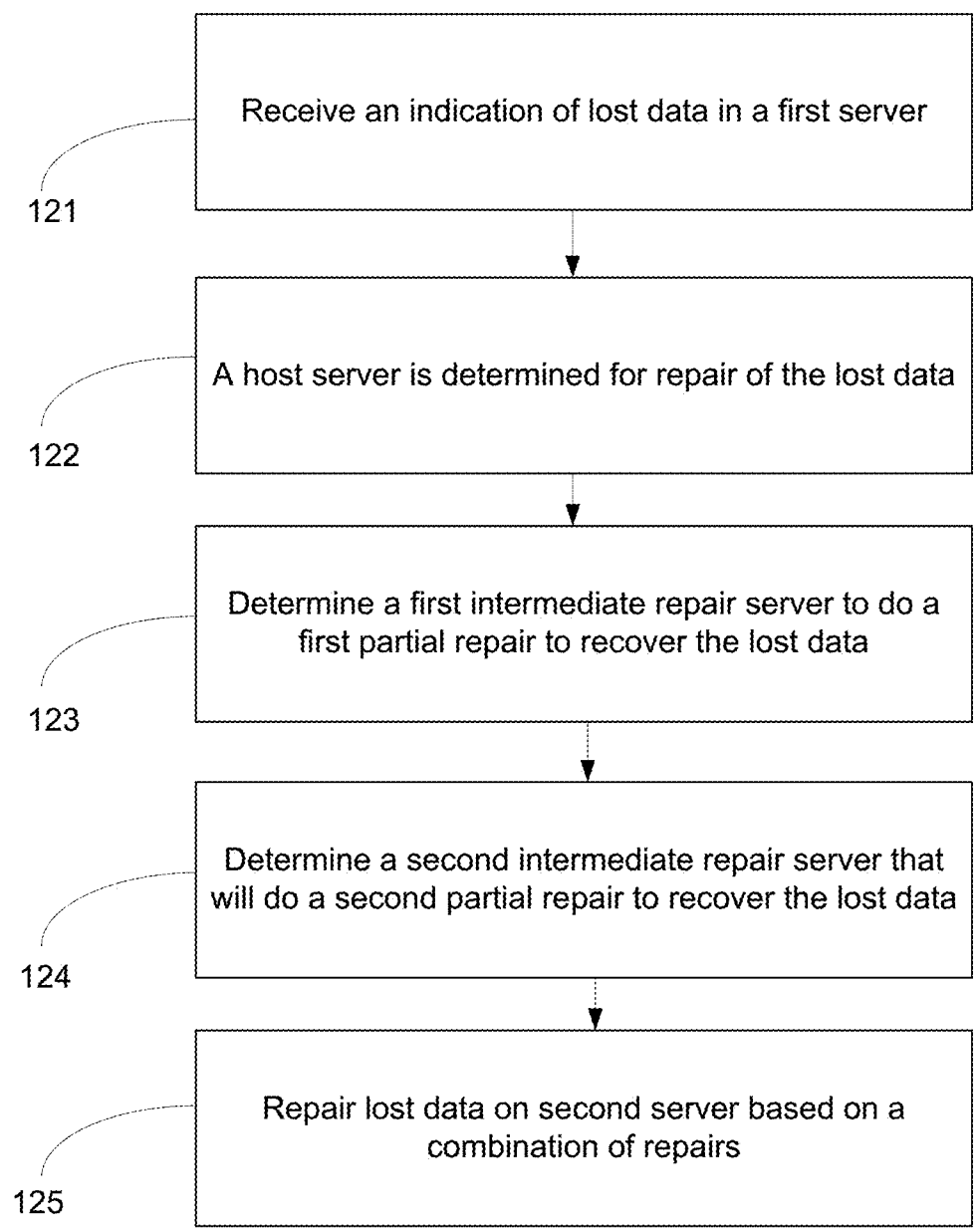
FIG. 3 illustrates an exemplary method for PPR reconstruction.

FIG. 3 illustrates an exemplary method for partial parallel repair as discussed herein. At step 121, an indication of a loss of data of a server is received (e.g., server 101 of FIG. 2B). At step 122, a host server (e.g., server 107) is determined. The host sever is used to store and ultimately complete the repair the lost data. At step 123, a first intermediate repair server is determined for a first chunk of the lost data. The first intermediate repair server (e.g., server 103) may be selected based on whether the server has one of a plurality of chunks associated with the lost data. As discussed herein, this allows for the part of the data needed for reconstruction to be already available locally on the intermediate repair server. At step 124, a second intermediate repair server (e.g., server 107) may be determined for a second chunk of the lost data. The second intermediate repair server (also discussed as aggregation chunk-servers or the like herein) may also be the host server as discussed in more detail with regard to FIG. 2. The second intermediate repair server then partially repairs the lost data. The first and second (and more if necessary) partial repairs may occur at approximately the same time. At step 125, the lost data is repaired based on a combination of the first chunk of the lost data and the second chunk of the lost data. The step may occur at the server 107 or may be another intermediate repair server (see FIG. 4A and FIG. 4B).

Different storage systems may detect loss of chunk differently. PPR works across different cases. As an example, in quantcast file system (QFS), each chunk-server periodically sends heartbeat message to a meta-server. When no heartbeats are received for more than a threshold number of time periods, the meta-server marks that chunk-server's data to be unavailable. Then the meta-server invokes Repair Manager (RM), which is a process running in the meta-server. RM creates a plan regarding which chunk-server needs to send which data to which server. Then it sends that plan to all the relevant chunk-servers. Then the chunk-servers carry out PPR repair. Consider another situation in QFS, where a client wants to read some data and contacts meta-server to learn the location of the data. Say the data is unavailable. This is the degraded read case. The meta-server invokes RM and the same process repeats.

Again, PPR does not depend on the process by which the information about loss of data is obtained. The above mentioned process is specific to QFS. If a storage system such as Ceph is considered, there are periodic processes (called scrubbing) that check the integrity of stored data. When it detects that some data has been lost, it informs "monitor"-which maintains information about storage topology. Then it informs "Primary OSD"—one of several servers holding a piece of erasure-coded chunk required to reconstruct data. Then the Primary OSD initiates repair. If PPR was implemented on Ceph, then a RM module would be running in monitor (or Primary-OSD), that gets notified when some data is lost. After that point, it would create the repair plan and distribute them to relevant "OSDs", just like RM distributes plan to chunk-servers in QFS. In short, the exact mechanism by which the information about loss of data is obtained could vary in different storage systems, but PPR can be used regardless of that mechanism.

FIG. 2B illustrates an exemplary PPR that reflects some of the steps of FIG. 3. As shown, a few logical timesteps may be taken to complete the reconstruction operation, where in each timestep a set of servers perform some partial repair operations to generate intermediate results in parallel. These partial operations may constitute a scalar multiplication of the local chunk data by the corresponding decoding coefficient (this operation happens during the first logical timestep) or an aggregate XOR operation between the received intermediate results from the earlier servers. The term decoding coefficient is used in a generic way. During reconstruction of a parity chunk for RS codes, an encoding operation may be performed. In that case, such coefficients will be 1.

With continued reference to FIG. 2, in an example, chunk $C_1$ is lost because of a failure in server 102. Server 107 is chosen as a new host to repair and store $C_1$. $C_1$ may be reconstructed using equation: $C_1=a_2C_2+a_3C_3+a_4C_4$, where $a_2$, $a_3$, and $a_4$ are decoding coefficients corresponding to chunks $C_2$, $C_3$, and $C_4$. In timestep 1, there may be a transfer 114 in which server 102 sends its partial result $a_2C_2$ to sever 103. There may also be a transfer 116, which may occur at approximately the same time as transfer 114. Server 104 sends its partial result $a_4C_4$ to server 107 in transfer 116. While at or about the same time server 103 also computes its own partial result $a_3S_3$. In timestep 2, server 103 sends in transfer 112 an aggregated (i.e. XORed) results to server 107, which may reduce the overall network transfer time by a factor of ⅓ or 33%. This behavior may be explained as follows. Let the chunk size be C MB and the available network bandwidth is $B_N$ MB/s. In traditional reconstruction, 3C MB of data goes through a particular link, resulting in a network transfer time of approximately $3C/B_N$ sec. In PPR, in each timestep, only one chunk is transferred over any particular link (since parallel transfers have different source and destination servers). Thus, the network transfer time in each timestep is $C/B_N$ sec, and since, there are two timesteps involved in this example, the total network transfer time is $2C/B_N$. The number of timesteps in PPR may be generalized as $\lceil \log_2(k+1) \rceil$, as disclosed in more detail herein.

Figure 4A:
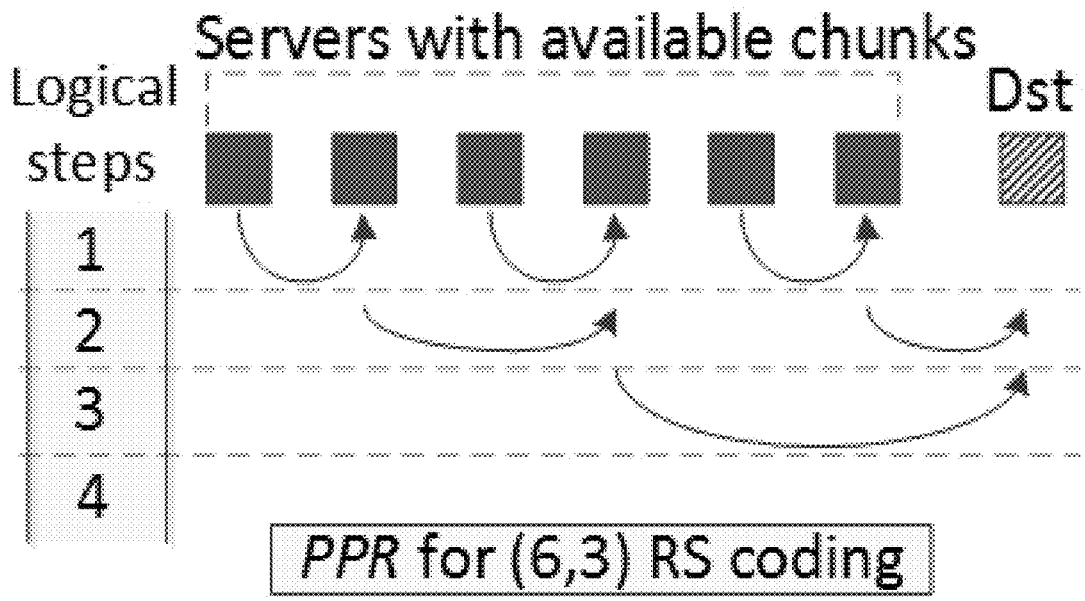
FIG. 4A illustrates data transfer pattern during PPR reconstruction for (6, 3) RS coding.
Figure 4B:
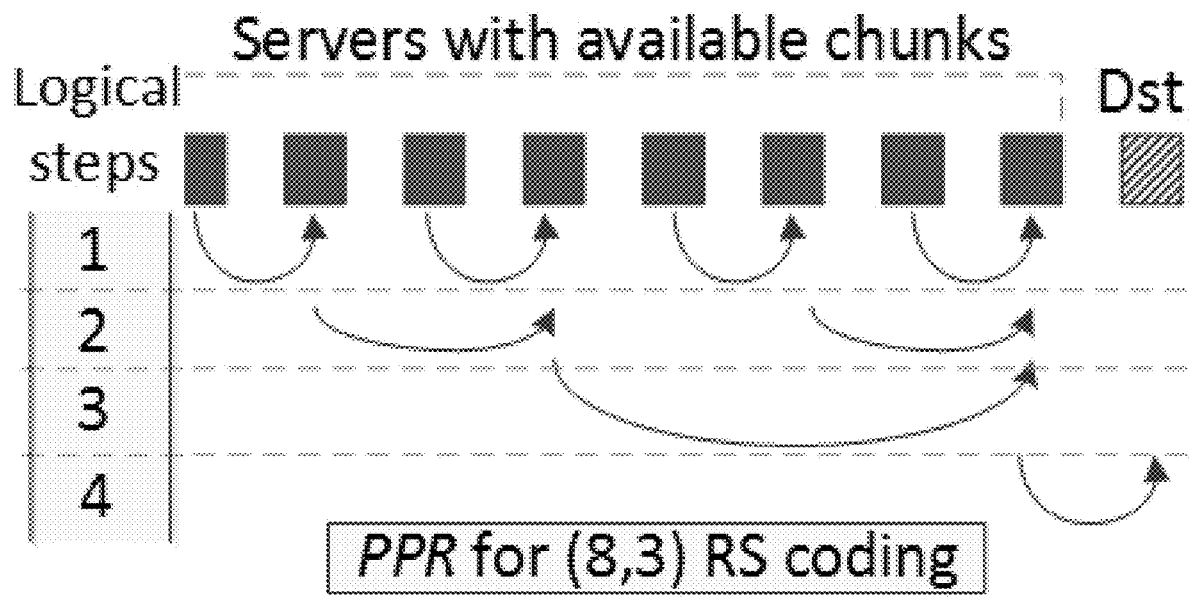
FIG. 4B illustrates data transfer pattern during PPR reconstruction for (8, 3) RS coding.

Even though PPR takes a few logical timesteps to complete the reconstruction process, in reality, it may significantly reduce the total reconstruction time. PPR overlays a tree-like reduction structure (also referred to as a Binomial Reduction Tree in HPC [28, 45]) over the servers that hold the relevant chunks for reconstruction. FIG. 4A and FIG. 4B illustrate examples of PPR based reconstruction techniques for RS codes (6,3) and (8,3) where network transfers are completed in 3 and 4 logical timesteps, respectively. Each timestep takes $C/B_N$ amount of time where, C is the chunk size and $B_N$ is the available bandwidth, which results in a total network transfer time of $3C/B_N$ in FIG. 4A and $4C/B_N$ in FIG. 4B. In comparison, conventional RS reconstruction for RS (6,3) and (8,3) would bring 6 and 8 chunks to a particular server with a network transfer time of $6C/B_N$ and $8C/B_N$ respectively. Thus PPR may reduce network transfer time by 50% in both exemplary cases. We introduce the following theorem to generalize the observation.

For (k, m) RS coding, network transfer time for PPR-based reconstruction is $\lceil \log_2(k+1) \rceil \times C/B_N$ as compared to $k \times C/B_N$ for the conventional reconstruction technique. Thus PPR reduces the network transfer time by a factor of $$\frac{k}{\lceil \log_2(k+1) \rceil}.$$

PPR reconstruction: During reconstruction, in total (k+1) servers are involved, out of which k servers host the relevant chunks and the remaining one is the repair site. PPR performs a binary tree-like reduction where (k+1) servers are the leaf nodes of the tree. Completion of each logical timestep in PPR is equivalent to moving one level up towards the root in a binary tree while reaching the root, marks the completion of PPR. Since the height of a binary tree with (k+1) leaves is $\log_2(k+1)$, PPR requires exactly $\log_2(k+1)$ logical steps to complete when (k+1) is a power of 2; the ceil function is used if that is not the case. During each step, the network transfer time is $C/B_N$ since the same amount C is being transferred on each link and each link has bandwidth $B_N$. Thus, the total network transfer time is $\lceil \log_2(k+1) \rceil \times C/B_N$.

Baseline EC Reconstruction:

A total of k chunks, each of size C, will be simultaneously retrieved from k servers. Thus the ingress link to the repair server becomes the bottleneck. If $B_N$ is the bandwidth of that ingress link, the total network transfer time becomes $k \times C/B_N$. Thus PPR reduces the network transfer time by a factor of $$\frac{k}{\lceil \log_2(k+1) \rceil}.$$

If $k=2^n-1$, where $n \in Z^+$, then the network transfer time is reduced by a factor of $$\Omega\left(\frac{2^n}{n}\right).$$

This reduction in network transfer time becomes larger for increasing values of n, i.e., for larger values of k. Since larger values of k (for a fixed m) can reduce the storage overhead of erasure coded storage even further, coding with high values of k is independently beneficial for storing large amounts of data. However, it has not been adopted in practice mainly because of the lengthy reconstruction time problem. Moreover, as an another benefit, the maximum data transfer over a link during reconstruction is also reduced by a factor of approximately $\lceil \log_2(k+1) \rceil/k$. In PPR, the cumulative data transfer across logical timesteps and including both ingress and egress links is $C \times \lceil \log_2(k+1) \rceil$. This behavior may be observed in FIG. 4A and FIG. 4B, which illustrates PPR based reconstruction technique for RS codes (6,3) and (8,3). Such a reduction facilitates a more uniform utilization of the links in a data center, or the like, which is a desirable property, particularly when the network is heavily loaded or under-provisioned.

The network with the servers may have a fat-tree like topology (see M. Al-Fares et al., A scalable, commodity data center network architecture, 2008), in which each level gets approximately full bisection bandwidth with similar network capacity between any two servers in the data center. In another example, the network may have a VL2-like architecture (see A. Greenberg, et al., V12: a scalable and flexible data center network. In *SIGCOMM*, 2009), which gives an illusion of all servers connected to a monolithic giant virtual switch. These fat-tree like topology and VL2-like architecture are popular choices for data centers. If servers have non-homogeneous network capacity, PPR may be extended to use servers with higher network capacity as aggregators, since these servers often handle multiple flows during reconstruction as depicted in FIG. 4A and FIG. 4B, for example. The benefits of PPR become prominent when network transfer is the bottleneck. Moreover, the effectiveness of PPR increases with higher values of k as discussed herein. PPR also becomes more attractive for larger chunk sizes.

PPR vs staggered data transfer: Since reconstruction process causes network congestion at the server acting as the repair site, a straightforward approach to avoid congestion could be through a staggered data transfer where, the repair server issues requests for chunks one-by-one from other servers. Such staggered data transfer pattern may add unnecessary serialization to the reconstruction process and increase the network transfer time. A significant issue to consider with a staggered data transfer approach is that it may avoid congestion in the network link to the repair server by under-utilizing the available bandwidth of network links. Thus, staggered data transfer technique may not be suitable for scenarios where reconstructions needs to be fast, e.g., in case of degraded reads. PPR decreases network congestion and may simultaneously increases parallelism in the repair operation. The majority of practical erasure codes are linear and associative. PPR based reconstruction may be readily applied on top of them. PPR may handle non-linear codes, as long as the overall reconstruction equation can be decomposed into a few independent and partial operations that are associative.

Computation speed-up and reduced memory footprint are discussed below. Parallel computations—PPR distributes the reconstruction job among multiple servers which perform partial reconstruction functions in parallel. For example, scalar multiplication with decoding coefficients and some aggregating XOR operations are done in parallel, as opposed to conventional serial computation at the repair site. In Cauchy-Reed Solomon coding, multiplications are replaced by XOR operations. For RS(k, m) code Table 2 highlights the difference between PPR and conventional RS reconstruction, in terms of the computation on the critical path.

TABLE 2

| PPR reconstruction computation | Conventional RS reconstruction computation |
| --- | --- |
| Creation of the decoding matrix + One Galois-field multiplication with coefficients (since parallel at multiple servers) + ceil(log2(k + 1)) number of XOR operations (done by aggregating servers) | Creation of the decoding matrix + k Galois-field multiplications with coefficients + k number of XOR operations. |

Reduced memory footprint—In the conventional RS reconstruction, the repair site collects all the k necessary chunks and performs the repair operation on those chunks. Since the processor actively performs multiplication or bitwise XOR operations on these k chunks residing in memory, the memory footprint of such reconstruction operation is on the order of kC where C is the chunk size. In PPR, the maximum bound on memory footprint in any of the involved servers is $C \times \lceil \log_2(k+1) \rceil$ because, a server may deal with only $\lceil \log_2(k+1) \rceil$ chunks.

Reducing disk IO with in-memory chunk caching is discussed below. In order to reduce the reconstruction time as much as possible, in addition to network transfer optimization, we also try to reduce disk IO time. Although read operations from multiple servers can be done in parallel, disk read still contributes a non-trivial amount of time to reconstruction (up to 17.8% in the experiment, as shown in FIG. 1). An in-memory least recently used (LRU) cache is designed that will keep most frequently used chunks in each server. As a result, the chunk required for reconstruction may be obtained from memory, rather than incurring the cost of reading from the disk. In addition, PPR maintains a usage profile for chunks that are present in the cache using the associated timestamp. The usage profile may influence the decision regarding which chunk failures should be handled urgently. For example, a chunk that is frequently used, and hence in the cache, may be repaired urgently. Even though caching helps to reduce the total reconstruction time, the technique itself is orthogonal to the main PPR technique. Caching can also be used with traditional repair techniques to reduce IO time.

Multiple concurrent repairs (m-PPR) is discussed below. In any reasonably sized data center, there can be multiple chunk failures at any given time because of either scattered transient failures, machine maintenance, software upgrade or hard disk failures. Although proactive repairs for such failures are often delayed (e.g., by 15 minutes by a company—see D. Ford, et al., Availability in globally distributed storage systems. In *OSDI*, 2010) in anticipation that the failure was transient, multiple simultaneous reconstructions can still happen at any point in time. A naive attempt to perform multiple overlapping reconstructions may put pressure on shared resources, such as network, and disk IO, leading to poor reconstruction performance. m-PPR schedules multiple reconstruction jobs in parallel while trying to minimize the competition for shared resources between multiple reconstruction operations. Each repair job may use PPR based reconstruction technique described herein. Scheduling of multiple reconstructions through m-PPR may be handled by a Repair-Manager (RM)—e.g., meta-server 131 of FIG. 5, which runs within a centralized entity.

The RM may keep track of information for the servers, such as whether a chunk is available in its in-memory cache, number of ongoing repair operations scheduled on the server, or user loads on the servers (e.g., processing or network links), among other things. User loads may be the processing loads. Other considerations may be measurements associated with network links, such as size (bandwidth), current congestion, or projected congestion (e.g., based on size of files/data), to one or more servers.

Based on this information the RM uses greedy heuristics to choose the best source and destination servers for each reconstruction job. For the source servers, m-PPR selects the k best servers out of the remaining k+m−1 servers. The use of "best" as discussed herein may be considered meeting a threshold amount or selecting from a list of scored servers or other devices that most favorable after being scored, such as the weights discussed herein. For the destination server, it chooses 1 out of the available N−(k+m) servers where, N is the total number of available servers. In practice, the number of possible destination servers may be further constrained by various factors. For example, some applications might require the chunks corresponding to one data stripe to be in close network proximity. Others might want affinity of some data to specific storage types, such as SSD. Some applications might want to avoid servers with same failure and upgrade domains. The RM calculates for each potential server, a source weight and a destination weight as follows:

$$w_{src}=a_1(\text{hasCache})-a_2(\text{\#reconstructions})-a_3(\text{user-Load}) \quad (1)$$

$$w_{dst}=-[b_1(\text{\#repairDsts})+b_2(\text{userLoad})] \quad (2)$$

Here $a_i$s, $b_i$s in Eq.(1) and Eq.(2) are the coefficients denoting the importance of various parameters in the source and destination weight equations. The hasCache is a binary variable denoting whether the relevant chunk is already present in the in-memory cache of that particular server. The number of reconstructions (# reconstructions) in Eq.(1) represents how many reconstruction jobs are currently being handled by the server. userLoad measures the network load handled by that server as part of regular user requests. The # reconstructions gives an indication of the maximum possible network bandwidth utilization by reconstruction operation at that server. In Eq.(2), the number of repair destinations (# repairDsts) represents how many repair jobs are using this server as their final destination. Intuitively, these source and destination weights represent the goodness of a server as a source or destination candidate for scheduling the next repair job.

Choosing coefficients is discussed below. The ratio of $a_1$ and $a_2$ may be calculated as $\alpha(\text{ceil}(\log_2(k+1)))/\beta$. Here $\alpha$ represents the percentage reduction in the total reconstruction time, if a chunk is found in the in-memory cache of a source server. $\beta$ denotes the ratio of network transfer time to the total reconstruction time in PPR. There is a comparison of how many simultaneous reconstructions would be onerous enough to offset the improvement from having a chunk in the cache. The ratio $a_2$ and $a_3$ may be calculated as $C \times \lceil \log_2(k) \rceil$. Essentially, from userLoad an equivalent number of PPR may be calculated based on reconstruction operations that would generate similar traffic. The ratio of $b_1$ and $b_2$ is identical to this. For simplicity, $a_2$ and $b_1$ is set to one and calculate other coefficients. For example, for RS(6, 3) code, 64 MB chunk size, and cluster with 1 Gbps network values of $a_1$, $a_2$, and $a_3$ are calculated to be 0.36, 1.0, and 0.005 when userLoad is measured in MB.

Scheduling is discussed in more detail below. The RM maintains a queue with missing chunk identifiers. To schedule reconstruction of multiple chunks in a batch using m-PPR algorithm, it pops up items one by one from the head of the queue and greedily schedules reconstruction jobs for each of those missing chunks. The RM uses Eq. (1) to calculate goodness score for servers holding relevant chunks of the missing data item and iteratively selects the best k source servers to schedule a PPR job. If less thank source servers are available, the RM may skip that reconstruction and put it back at the end of the queue for a later try. The RM also locates a suitable destination server to schedule a repair job. Not all available servers in the data center are the best candidates for the destination server because of reliability or other reasons. The servers already holding the corresponding data or parity chunks from the same stripe and the ones in the same failure domain (servers that can fail together e.g., within a rack) or upgrade domain (that are likely to be down at the same time because of the software or hardware upgrades) may be avoided for reliability reasons. For the remaining destination candidates, the RM calculates a weight to capture the current load on that server using Eq. (1). Next, the most lightly loaded server is selected as the final destination for that repair job. After scheduling a job, the weights are updated to reconsider the impact on the shared resources. This process is illustrated in Table 3.

TABLE 3 m-PPR: Scheduling for multiple reconstructions

1:  for all missingChunk ∈ missingChunkList do
2:      hosts ← GETAVAILABLEHOSTS(missingChunk);
3:      reconstSrc ← SELECTSOURCES(hosts); //Choose best sources
4:      reconstDst ← SELECTDESTINATION(hosts, allServers);
        //Choose the best destination
5:      // Schedule a PPR based single reconstruction
6:          SCHEDULERECONSTRUCTION(reconstSrc, reconstDst);
7:      // Update state to capture the impact of scheduled
        reconstruction 8: UPDATESERVERWEIGHTS( );
9:  end for
10: // Choose k out of k + m − 1 available sources
11: procedure SELECTSOURCES(hosts)
12:     sortedHosts ← SORTSOURCES(hosts);
13:     selectedSources ← [ ];
14:     while selectedSources.size ≤ k do
15:         anotherSourceServer ← sortedHosts.pop( );
16:         selectedSources.add(anotherSourceServer);
17:     end while
18:     return selectedSources;
19: end procedure
20: //Find a destination server as repair site
21: procedure SELECTDESTINATION(hosts, allServers)
22:     ifdegraded read return Client; //Degraded read:client is destination
23:     // For reliability, exclude existing hosts
24:     possibleDsts ← FINDPOSSIBLEDESTINATIONS(hosts, allServers);
25:     sortedDsts ← SORTDESTINATIONS(possibleDsts);
26:         chosenDst ← sortedDsts.pop( ); //Choose the best repair site
27:     return chosenDst
28: end procedure The overall complexity of m-PPR for scheduling a reconstruction is O{N log(N)}. Again, N is the number of possible destination servers and also N>>k, m.

Staleness of information is a consideration and is discussed below. Some of the parameters used in Eq.(1) and Eq.(2), such as hasCache and userLoad can be slightly stale as RM collects these metrics through heartbeats from the servers. Since such staleness is limited by the frequency of heartbeats (e.g., 5 seconds), minor staleness (e.g., 5 seconds) may not affect the usability of m-PPR. Moreover, RM monitors the scheduled reconstructions and if a job does not finish within a threshold time, RM may reschedule it and choose one or more new servers, as discussed herein. Note m-PPR may be considered a greedy algorithm because for each reconstruction, it chooses the best server combination at that point.

The scheduling load in m-PPR may be distributed over multiple RMs. Each one of the RMs may be responsible for coordinating repairs of a subset of chunk failures. In a more distributed architecture, one of the source servers can also take the responsibility of choosing a new destination server and distribute a repair plan to coordinate the repair with other peers.

Figure 5:
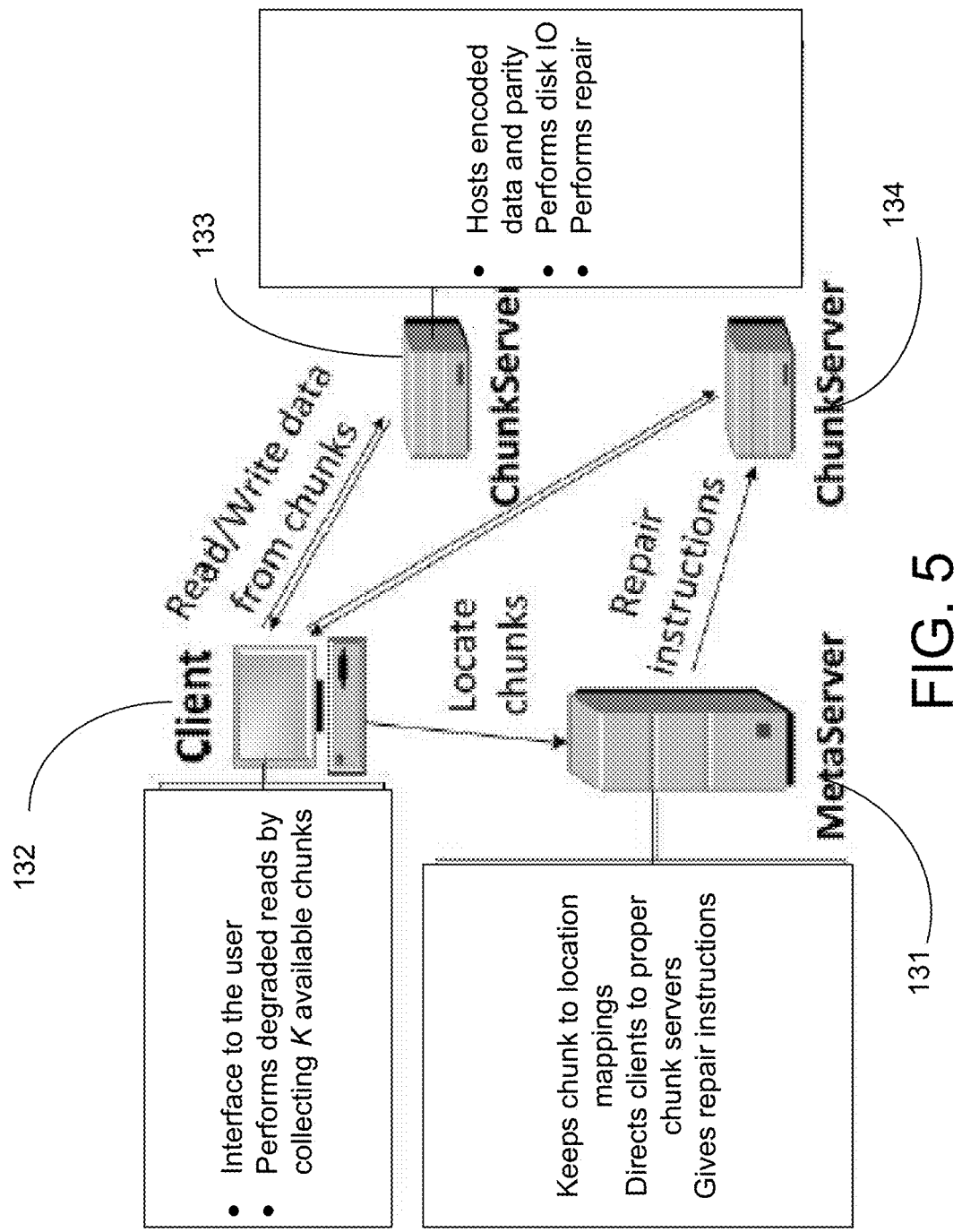
FIG. 5 illustrates components in QFS architecture used for PPR or m-PPR.
Figure 6:
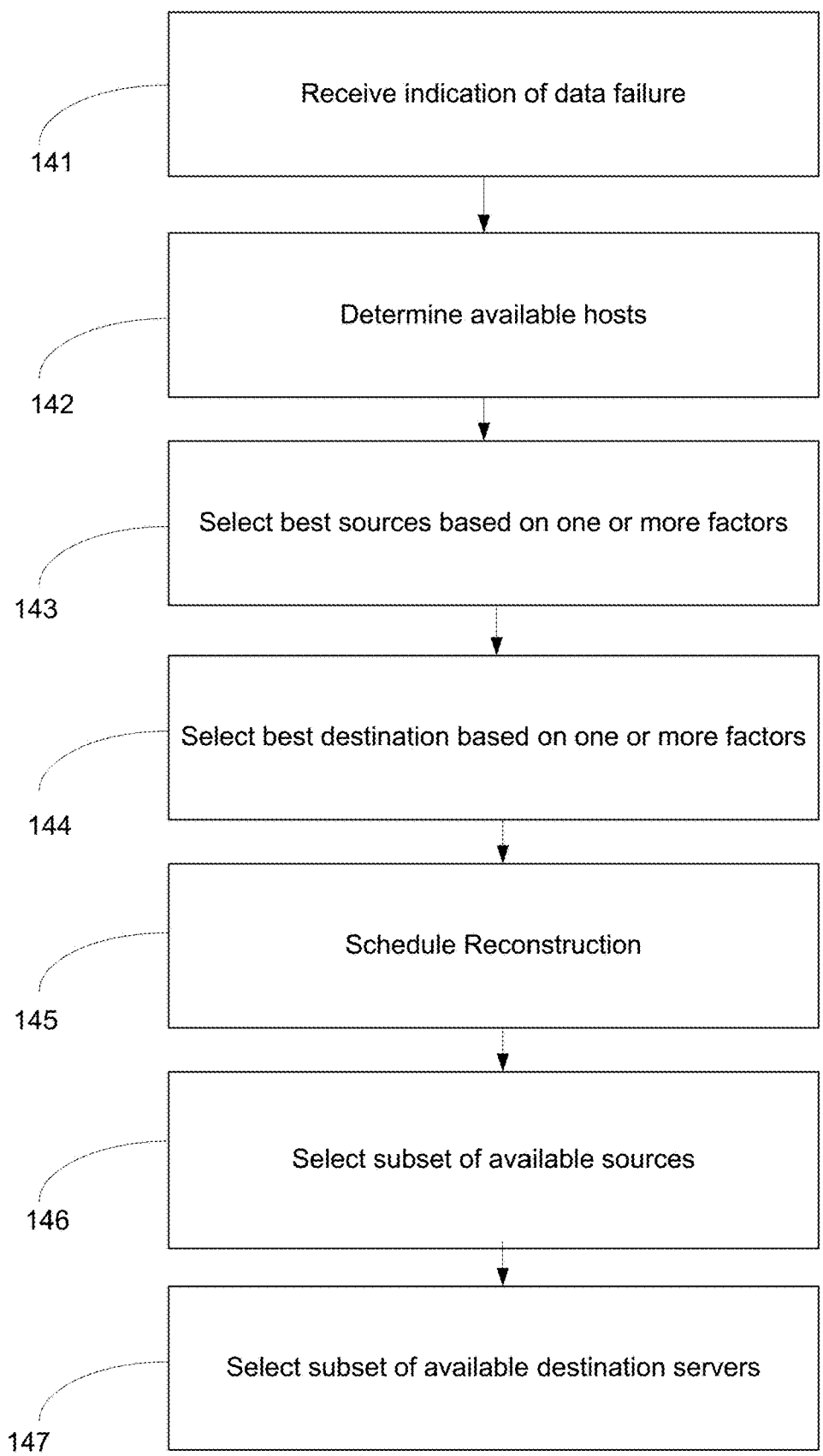
FIG. 6 illustrates an exemplary method for m-PPR reconstruction.

FIG. 6 illustrates an exemplary m-PPR process. At step 141, RM 131 of FIG. 5 receives an indication that there are one or more chunk failures. At step 142, available host servers (servers that host relevant chunks) for the reconstruction process are determined. At step 143, top rated (e.g., best or within a threshold rating) sources are selected based on one or more factors. Factors may include processor performance or link to the host performance, among other things. At step 144, top rated (e.g., best or within a threshold rating) destination sever (repair server) is selected based on one or more factors. At step 145, a repair is scheduled. At step 146, select top rated sources (e.g., best or sources within a threshold rating) that are available for the scheduled repair. This is a subset of the available host servers of step 142. If there are not enough available host servers at the scheduled time then the repair may be rescheduled for a later time. At step 147, select top rated destination repair server (e.g., best or destination within a threshold rating) that is available for the scheduled repair. Existing hosts may be excluded as destination repair server for reliability reasons. More details regarding m-PPR are discussed below.

Below is an exemplary design and implementation of PPR. Quantcast file system (QFS) is a distributed file system which provides stable RS based erasure coding for lower storage overhead and higher reliability. QFS evolved from the Kosmos File System. FIG. 5 illustrates components of a QFS architecture. Centralized meta-server 131 (e.g., RM) manages the file system's directory structure and mappings of RS chunks to the physical storage locations. Chunk-server 133 runs on each machine where the data is hosted and manages disk IO. Client 132 refers to an entity that interfaces with the user requests. During read (or write) operation, client 132 communicates with meta-server 131 to identify which chunk-server 133 holds (or will hold, in the case of write) the data, then directly interacts with chunk-server 133 to transfer the data. Chunk-servers 133 (or chunk-server 134) may periodically send heartbeat messages to meta-sever 131 and meta-server 131 may periodically check the availability of the chunks (monitoring). If meta-sever 131 detects a disk or server failure (through heartbeat) or a corrupted or a missing chunk (through monitoring), it starts the repair process which may first designate one chunk-server 133 as a repair site and then performs the traditional repair process. In case of a degraded read, where client 132 identifies a missing chunk while trying to read, the reconstruction happens in the critical path initiated by client 132 which again may first gather k chunks before executing a decoding operation.

Figure 7:
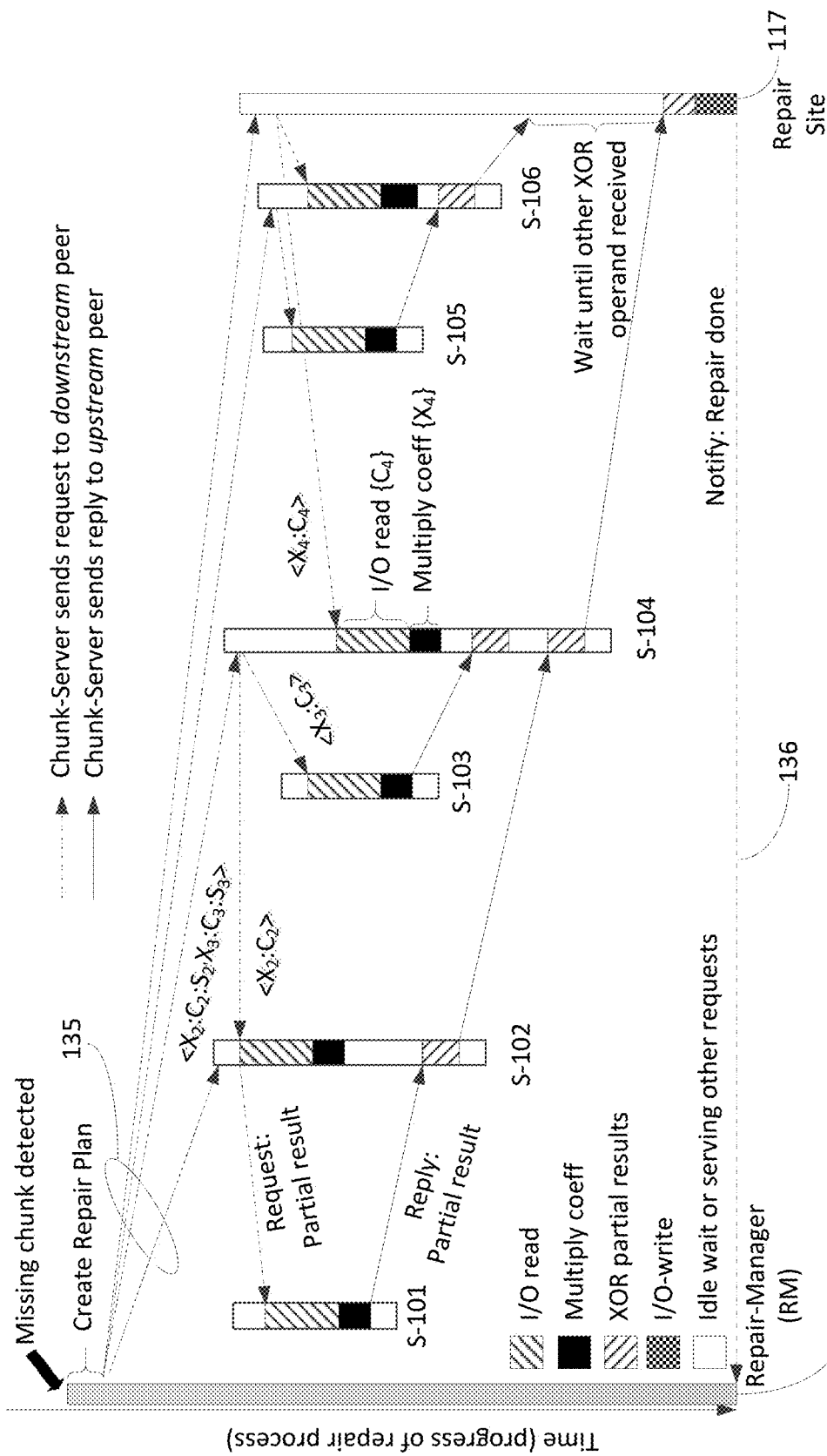
FIG. 7 illustrates Message exchanges among Chunk-Servers and RM for (6,3) RS reconstruction.

Below are implementation details to enable PPR in QFS. For a regular repair, meta-server 131 invokes a repair manager (RM). FIG. 7 illustrates an exemplary message exchange among chunk-servers and RM for (6, 3) RS reconstruction. RM 131 selects k out of the remaining k+m−1 chunks for the reconstruction of the missing chunk. This selection is done by m-PPR (e.g., method of Table 3). RM 131 first analyzes which chunks are available for repair and computes the decoding matrix accordingly. From the decoding matrix RM 131 calculates decoding coefficients corresponding to each participating chunk. RM 131 distributes these coefficients along with a repair plan to k/2 chunk-Servers (e.g., server 102, server 104, and server 106 in FIG. 7) and also to repair site 117 (e.g., server 107 of FIG. 2). Lines 135 are messages notifying the servers of the repair plans. Note that the servers to notify may be based on the whether the server was chosen to be an intermediate repair server. At line 136, a message is sent to notify RM 131 after repair completion.

In FIG. 7, a Chunk-Server $S_4$ receives a plan command $<x_2:C_2:S_2, x_3:C_3:S_3>$ from the RM where $x_i$'s are the decoding coefficients, $C_i$'s are the chunk identifiers (chunkId), and $S_i$'s are the corresponding Chunk-Servers. This plan indicates server 104 would aggregate partial results from downstream peers server 102 and server 103. Therefore, server 104 sends requests $<x_2:C_2>$ and $<x_3:C_3>$ to these servers indicating server 102 and server 103 would return results after reading the chunks $C_2$ and $C_3$. Then it multiplies those by using coefficients $x_2$ and $x_3$ respectively. As part of the same repair plan, server 104 also receives a request $<x_4:C_4>$ from its upstream peer (in this case the repair site). Thus server 104 schedules a local disk read for chunk $C_4$ which would be multiplied by the coefficient $x_4$. Server 104 waits for results from server 102 and server 103 and performs incremental XORs before replying to its upstream peer with an aggregated result. Repair site 117 aggregates the results by XORing all the results coming from the downstream chunk-servers to reconstruct the missing chunk and writes back to the disk at the end of the operation. Then repair site 117 (e.g., the destination chunk-server for repair) sends a message to RM 131 indicating a successful completion of the repair operation.

If a degraded read operation triggers the PPR-based reconstruction, client 132 may act as the repair site and inform RM 131 about a missing chunk. Then RM 131 may distribute a repair plan with a high priority.

The number of flows, as well as the number of nodes involved in PPR, is exactly the same as in traditional repair. It is equal to k. Since k is small in practice (between 6 to 12), the probability of encountering a relatively slow node is small in both conventional repair and PPR. Slow nodes (e.g., server 102 or server 104) may be considered and RM 131 may use node usage statistics (e.g., CPU, I/O counters, among other things that may be collected with the heartbeat messages) to de-prioritize the slow nodes before creating the repair plan. If reconstruction does not complete within a certain time threshold (because of unpredictable congestion or failures), RM 131 reschedules the reconstruction process with a new repair plan.

Disk IO (read/write) time may be a significant component in the overall reconstruction time. Aggregation chunk-servers, which had posted downstream requests (e.g., $S_2, S_4, S_6$), read different chunks from disk and wait (because network transfer of a chunk usually takes longer than IO time) for data transfer from its downstream peer chunk-server to complete. Then they apply the aggregating XOR operation and send the result to further upstream servers in the tree. To increase parallelism, aggregation chunk-servers may schedule IO-reads in parallel with data transfer from network.

To further reduce the impact of IO-read time, an in-memory caching mechanism may be introduced in chunk-servers as described herein. When choosing k out of the remaining k+m−1 chunk-servers for a reconstruction operation in m-PPR protocol, RM 131 may give higher priority to hot chunks but try to avoid very-hot chunks in order to minimize the impact on application performance. However in experiments, for multiple simultaneous reconstructions, it was found that ensuring these reconstructions make use of the disjoint servers has a greater benefit than cache-aware server assignment in the context of a data center, since in general data centers are constrained by network resources. "Hot" chunks are those chunks which are present in memory (or cache). They are hot because they can be accessed fast, without incurring the overhead of reading data from disk. "Very hot" chunks are those hot chunks which are accessed very frequently by applications. For example, one could use a threshold based mechanism to distinguish between hot and very-hot chunks (e.g., if a chunk has been accessed in memory more than n times in the past t seconds, it is very-hot, otherwise it is hot.)

PPR technique is general enough to be applicable to other widely used erasure coded storage systems. Specifically the architecture of HDFS with erasure coding is almost identical to that of QFS, and therefore PPR is directly applicable. In addition, our technique can also be applied to Ceph, which is another popular distributed storage system that supports erasure coding. In Ceph, clients use a pseudo-random mapping function called CRUSH to place and access data chunks, rather than relying on a centralized meta server. Nonetheless, it does have a centralized entity, called ceph monitor (ceph-mon), which knows the layout of Object Storage Devices (OSDs) (equivalent to Chunk-Servers in QFS). ceph-mon is responsible for checking the health of each OSD, letting the newly joined OSDs know the topology, etc. Thus, we can augment such an entity with RM to enable PPR. Moreover, we can also augment OSD with RM function, since OSDs know where a given chunk is (or will be) located based on the pseudo-random mapping function.

To implement PPR, the following exemplary changes to the QFS codebase were made during testing (not necessarily in chronological order). First, QFS code was extended to make chunk-size configurable; QFS uses a fixed chunk-size of 64 MB. Second, PPR decoding operations were implemented using Jerasure and GF-Complete libraries, which were not the defaults in QFS. Jerasure allows a configurable set of coding parameters, while the default in QFS just supports the (6, 3) code. Third, meta-server was augmented to incorporate an RM to calculate decoding coefficients, create a repair plan, and distribute it to chunk-servers. RM also keeps track of the cached chunks at chunk-servers. Fourth, chunk-server's state machine was modified to incorporate PPR protocol to communicate with peers and the RM, and search for a chunk in its memory cache before attempting to perform disk IQ. Note that it was found that implementation of PPR-based reconstruction may be fully transparent to the end user.

Figure 8:
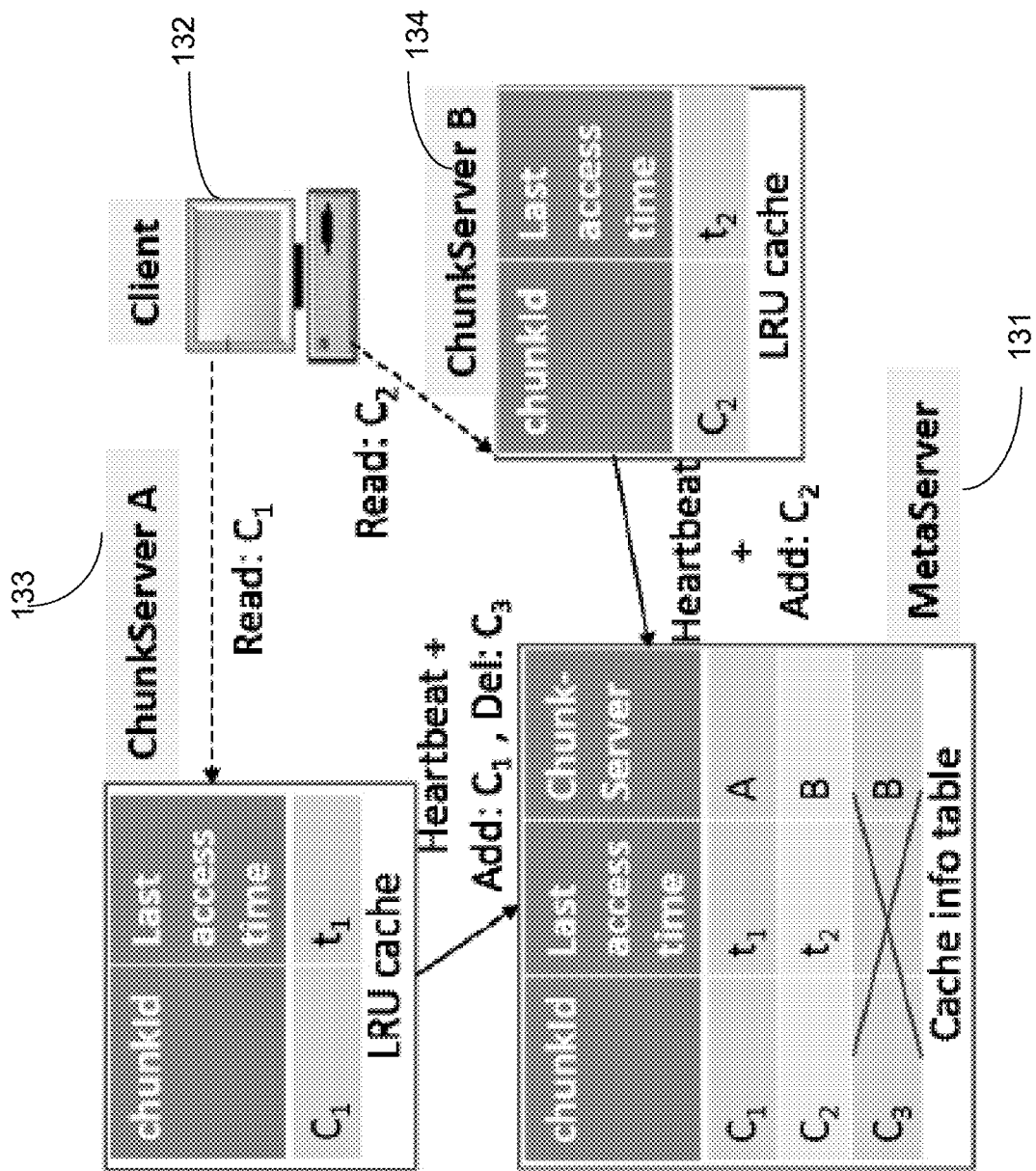
FIG. 8 illustrates Protocol for LRU cache with updates piggybacked on heartbeat messages.

FIG. 8 illustrates an exemplary implementation of PPR with LRU cache. In this implementation updates are piggybacked with heartbeat messages.

Disclosed below are possible technical effects of the PPR subject matter disclosed herein. A technical effect may be a reduction in repair time without negatively affecting data reliability, storage overhead, and repair degree. With PPR, partial repairs may be used to speed up time to repair data in erasure-coded storage systems. Note that the technique may reduce repair time, but not necessarily the total repair traffic aggregated over the links. Further, PPR is complementary to existing repair-friendly codes since it can be trivially overlaid on top of any existing EC scheme.

PPR may be overlaid on top of many published erasure coding schemes. The list includes, but is not limited to, the most widely used RS code, LRC code (Locally Repairable Code or Local Reconstruction Code), PM-MSR code, RS-Hitchhiker code, or rotated-RS code. This is because the distribution of PPR is orthogonal to the coding and placement techniques that distinguish these prior works.

During testing PPR was implemented on top of the Quantcast File System (QFS), which supports RS-based erasure coded storage. For typical erasure coding parameters depicted in Table 1, results based on use of the prototype achieved up to a 59% reduction in repair time out of which 57% is from reduction in network transfer time alone. Such significant reduction in reconstruction time was achieved without any perceived degraded data reliability or increased storage overhead.

PPR does not depend on a particular process by which the notification about the failure or loss of an erasure-coded chunk(s) is received. Different storage systems may use different processes to learn about the loss of erasure-coded chunks. For example, when a client wants to read a data chunk that no longer exists, the storage system learns that the repair has to be initiated. Some storage services run periodic monitoring processes to check if any erasure-coded chunk is lost. PPR works in most scenarios where it knows that an erasure-coded chunk(s) has been lost. PPR does not necessarily need to know "how" that information about the loss of data is obtained, which may assist it working well on a variety of storage systems.

Figure 9A:
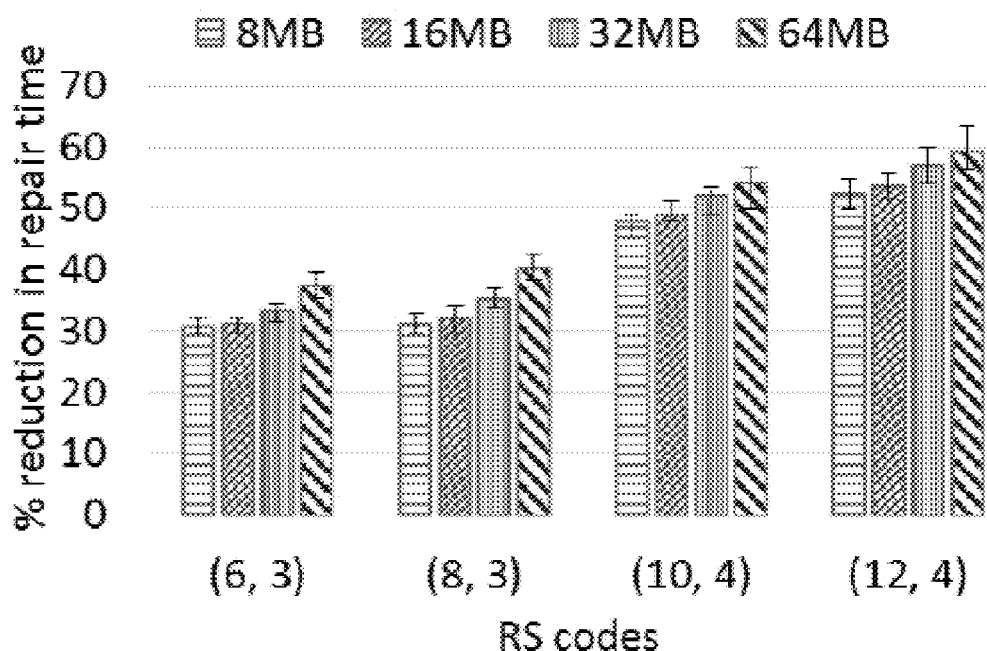
FIG. 9A illustrates percentage reduction in repair time with PPR over baseline Reed-Solomon code for different chunk sizes and coding parameters.
Figure 9B:
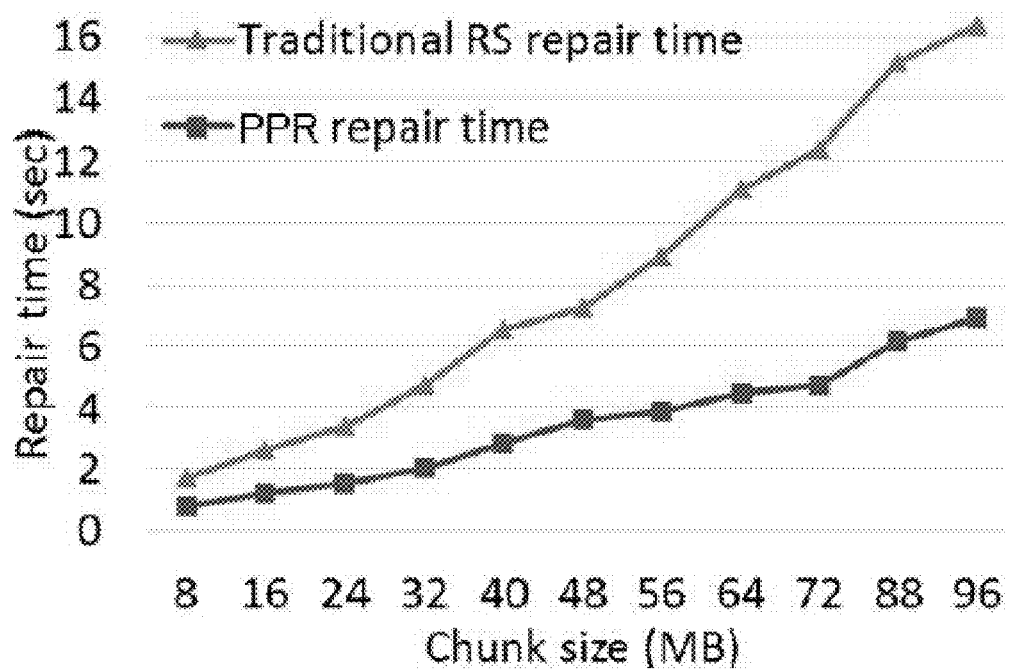
FIG. 9B illustrates traditional repair vs. PPR using RS (12, 4) code.
Figure 9C:
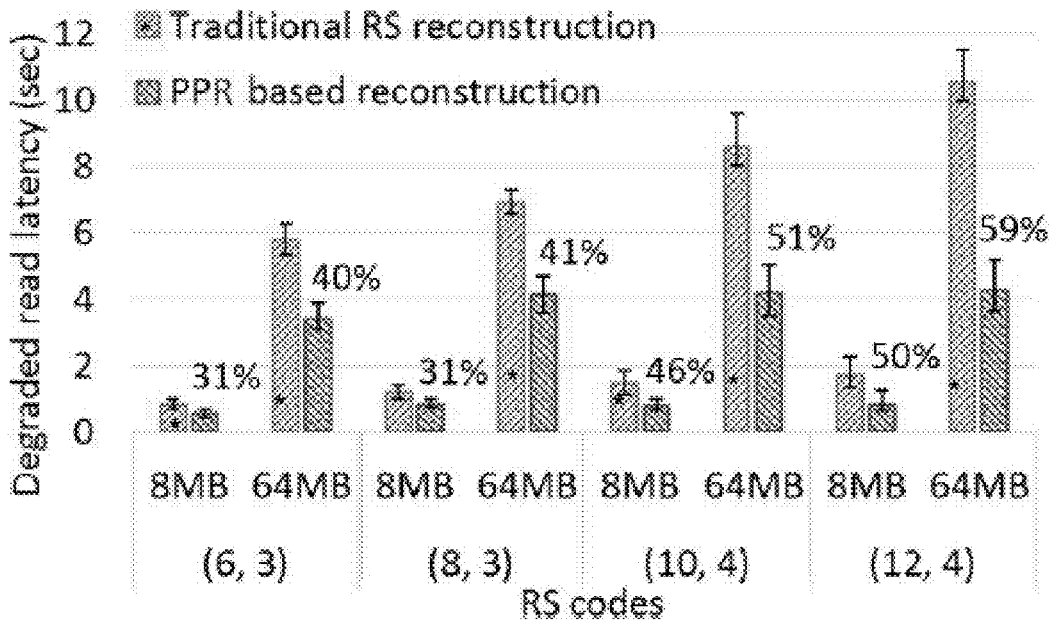
FIG. 9C illustrates improvement in degraded read latency.

FIG. 9A-FIG. 9D illustrates exemplary results of one or more implementations of PPR. Recall that a degraded read happens when a user submits a read request for some data that is currently unavailable. As a result, the requested chunk must be reconstructed on the fly at the client before the system replies to the user request. FIG. 9C illustrates how PPR can drastically reduce degraded read latency for 4 common RS coding parameters: (6, 3), (8,3), (10, 4), and (12, 4), and for two different chunk sizes: 8 MB and 64 MB. FIG. 9C shows that the reduction in de-graded read latency becomes more prominent for the codes with higher values of k. For traditional RS reconstruction, the degraded read latency increases linearly to k but for PPR the latency increases only logarithmically to k, thus providing larger benefit for larger values of k. Moreover, it is also noticeable that a higher chunk size provides even more percentage reduction because of the same effect.

Figure 9D:
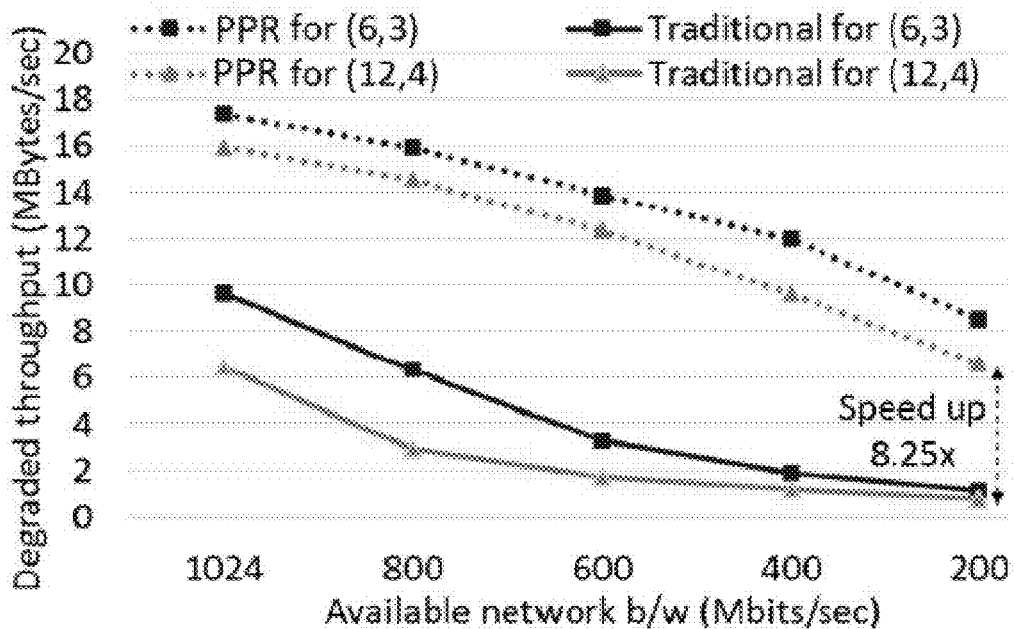
FIG. 9D illustrates degraded read throughput under constrained bandwidth.

As shown in FIG. 9D, as we decrease the available bandwidth from 1 Gbps to 200 Mbps, the degraded read throughput with traditional RS reconstruction rapidly drops to 1.2 MB/s and 0.8 MB/s for RS (6, 3) and RS (12,4) codes, respectively. In contrast, network transfers are distributed for PPR reconstruction, thereby achieving higher throughput-8.5 MB/s and 6.6 MB/s for RS (6, 3) and (12,4) codes, respectively. With a relatively well-provisioned network (1 Gbps), the gains of PPR are 1.8× and 2.5×, while with the constrained bandwidth (200 Mbps), the gains become even more significant, almost 7× and 8.25×.

Figure 10:
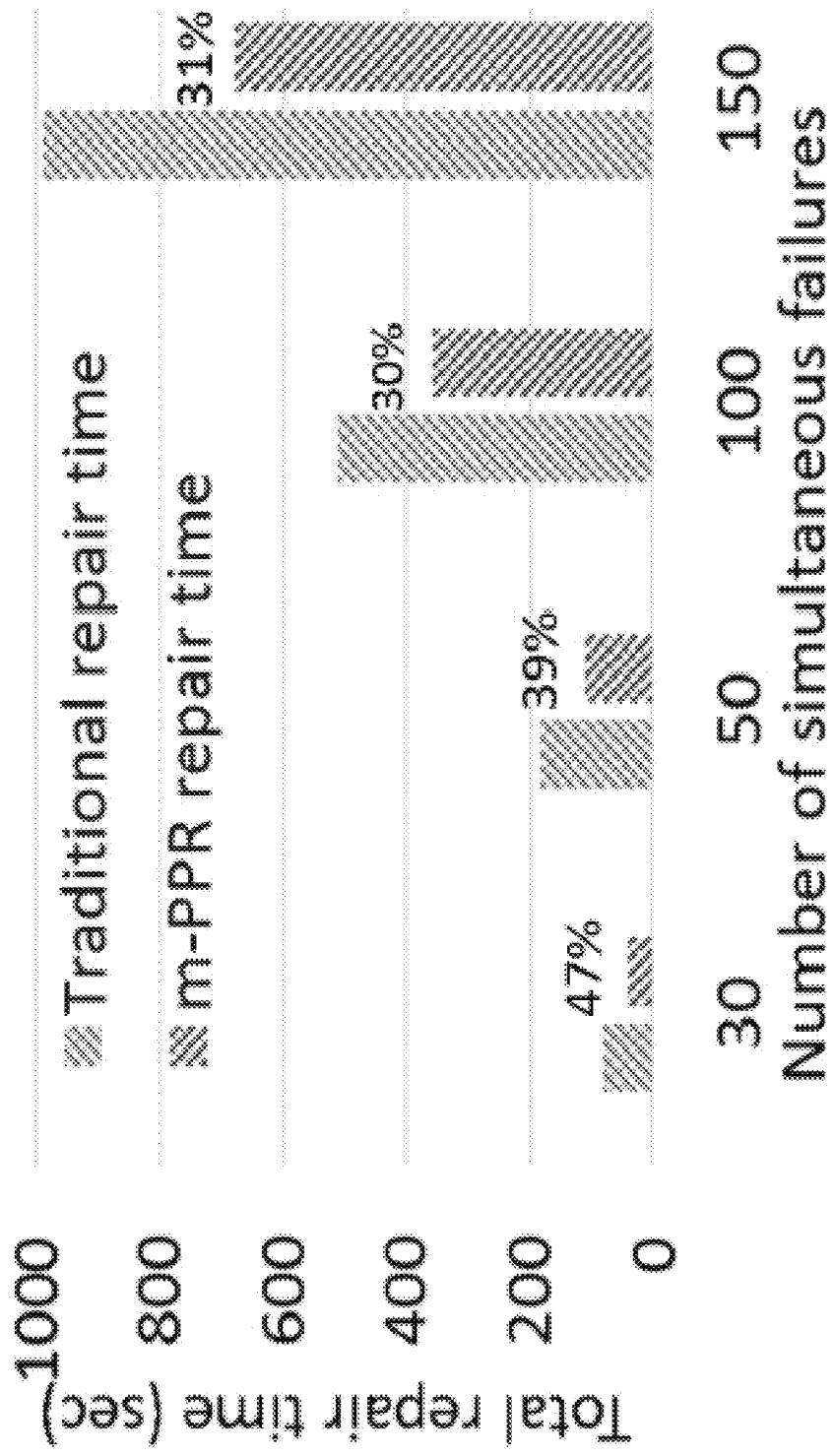
FIG. 10 illustrates comparison of total repair time for simultaneous failures triggered by Chunk-Server crash.

FIG. 10 helps illustrate the effectiveness of m-PPR in scheduling multiple repairs caused by simultaneous chunk failures. FIG. 10 shows that the m-PPR technique provides a significant reduction (31%-47%) in total repair time compared to traditional RS repair. If the testbed has more resources (more hosts, higher network capacity, etc.), m-PPR may perform better for the scale of simultaneous failures considered in our experiments.

For additional perspective, below is a primer of the mathematics behind RS coding. Erasure coded storage is attractive mainly because it requires less storage overhead for a given level of reliability. Out of many available erasure coding techniques, Reed-Solomon (RS) coding is the most widely used. RS code belongs to the class of Maximum Distance Separable (MDS) codes, which offers the maximum reliability for a given storage overhead. For a (k, m) RS code, the available data item of size N is divided into k equal data chunks each of size N/k. Then m additional parity chunks are calculated from the original k data chunks. The term stripe refers to this set of (k+m) chunks that is created from the original data. The mathematical property, based on which the parity chunks are created, ensures that missing chunk (data or parity) can be reconstructed using any k of the remaining chunks. After the reconstruction process, the server where the reconstructed data is hosted is referred to as the repair site. Thus, the repair site is a server for a regular repair; while for a degraded read, it is the client component which has issued the read request.

In FIG. 11A when a chunk is lost, it can be reconstructed using some linear algebraic operations with G and a remaining chunk set from the stripe. For example, in Case 1 in FIG. 11B, if a parity chunk (e.g., $P_2$) is lost, it can be recalculated by multiplying the corresponding row (i.e. the last row in the example) of G by the data chunk vector. On the other hand, if a data chunk (e.g., $D_3$) is lost, the reconstruction involves two steps: the first step calculates a decoding matrix H, by taking the inverse of a matrix created using any k (e.g., 4 in our example) surviving rows of G. We refer to the elements of H as decoding coefficients. The second step multiplies the previously selected k surviving chunks (a combination of data and parity) by the row of the decoding matrix corresponding to the lost chunk (e.g., the 3rd row in the figure). Thus the decoding process is to solve a set of independent linear equations.

Both for regular repair and degraded read, the reconstruction path consists of three major steps: multiple servers read the relevant chunks from their own disks (usually done in parallel at each server), each server sends the read chunk to the repair site over the network and finally some computation is performed at the repair site to reconstruct the erasured chunk. For regular repairs, the reconstructed chunk is finally written back to the disk while for degraded reads, the data is directly used by the user request. Thus, the reconstruction time for (k, m) RS coding can be approximated as follows:

$$T_{reconst} = \frac{C}{B_I} + \frac{kC}{B_N} + T_{comp}(kC) \quad (3)$$

Where C is chunk size, $B_I$ and $B_N$ denote the IO and network bandwidth, respectively. $T_{comp}$ is the computation time, which is a function of a total data size (kC).

FIG. 1 illustrates that network transfer and IO read are the two most time consuming steps, while the computation time is relatively insignificant. Among these, network transfer time is the most dominant factor because k chunk transfers are required per reconstruction. Often such huge data transfer creates a network bottleneck near the repair site. For example, Facebook uses RS(10, 4) code with a data chunk size of 256 MB. In this case, for repairing a single chunk, more than 20 Gbits need to be funneled into one server. This volume of data has been found to overwhelm network resources in many practical cases leading to extremely long reconstruction time. In spite of recent advances in network technology, with the rapid growth of network heavy applications, the network still remains the most scarce resource in data centers and network transfer time will continue to remain a bottleneck for reconstruction operations in EC storage.

Such long reconstruction time would still have been a non-issue if reconstructions were infrequent enough. However, traces of failures from large data centers indicate, that is not the case. Analyzing failures in Facebook data centers, report on average 50 machine unavailability events (where the machine fails for more than 15 minutes) per day, in a data center with a few thousand machines, each of which has a storage capacity of 24-36 TB. To maintain data reliability, these events ultimately lead to reconstruction operations. Moreover, there is a report that transient errors with no permanent data loss correspond to 90% of data center failure events. These cases often lead to degraded reads where the reconstruction operation happens in the critical path of the user read request.

Thus, long reconstruction time is the main hindrance toward wide scale adoption of erasure coded storage for distributed storage and network transfer time is expected to remain the primary cause for this for the foreseeable future.

This observation has also been made by many prior researchers. Their solutions have taken two forms. In the first form, several solutions design new coding schemes that reduce reconstruction traffic, but incur a higher storage overhead. In the second form, the proposed solutions place erasure encoded data in such a way that the amount of data that needs to be read for the common failure cases is kept small.

It has been observed that there is a third way of reducing the network bottleneck during recovery in erasure coded storage: determining intelligently where the repair takes place. In existing repair schemes, the repair operation happens in a centralized location—the repair site—which may be the server where the recovered chunk will be placed, or the client that initiates the read request for the lost data. A distributed repair technique PPR is disclosed, where partial results are computed locally at the server hosting the chunks. Then these results are aggregated to reconstruct the missing chunk. This distributed technique may not appear to be significant because the computational burden of repair in erasure codes is minimal. However, the process of conveying the chunks to a single point in itself creates a bottleneck and load imbalance on some network links. The process of distributing the repair burden among multiple servers has the benefit of removing such a bottleneck and load imbalance. PPR distributes the task of decoding among multiple servers, in a fashion reminiscent of binomial reduction trees from the High Performance Computing (HPC) world.

Because of a mathematical property of the repair operation, this distribution means that the amount of traffic coming out of any aggregator server is half of the sum of the traffics coming in from the two inputs, into the aggregator server. The final destination of the repair traffic, where the complete reconstructed data is finally available, is not overloaded with network traffic in its incoming link. Rather, with PPR, even the incoming link to that destination server gets approximately as much traffic as the first aggregator server. This mathematical property has the desired effect of reducing the network transfer time during repair from erasure coded storage.

Figure 12:
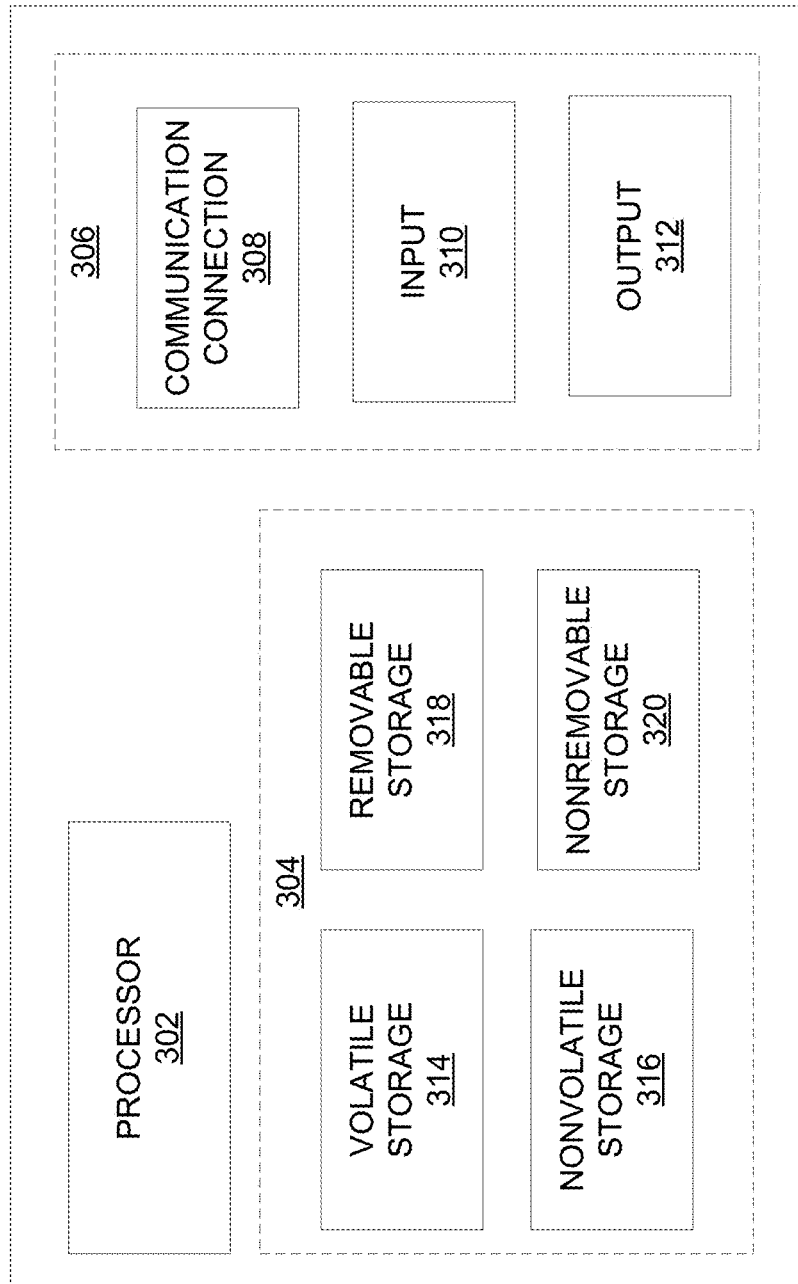
FIG. 12 illustrates a schematic of an exemplary network device.

FIG. 12 is a block diagram of network device 300 that may be connected to or comprise a component of networks as illustrated in FIG. 2, FIG. 4, FIG. 5, FIG. 8, and the like. Network device 300 may comprise hardware or a combination of hardware and software. The functionality to facilitate telecommunications via a telecommunications network may reside in one or combination of network devices 300. Network device 300 depicted in FIG. 12 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 12 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 12) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—parallel partial repair—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A computer-implemented method for repair of storage, the computer-implemented method comprising:
   detecting, by a processor of a first server, an indication of data loss in storage of the first server;
   responsive to receiving the indication of data loss,
      determining, by the processor, a destination server to host a completed repair of the lost data; and
      determining, by the processor, a set of servers to do partial repairs of the lost data wherein the determining of the set of servers for partial repairs is based on an availability in cache of data chunks required for partial repair of the lost data; and
      coordinating, by the processor, instructions to do the completed repair of the lost data on the destination server based on a combination of the partial repairs.

2. The method of claim 1, wherein the partial repairs of the lost data occurs at approximately the same time.

3. The method of claim 1, wherein the determining of the set of servers for partial repairs is further based on availability of data chunks required for partial repair of the lost data.

4. The method of claim 1, wherein the determining, by the processor, of the set of servers for partial repairs is further based on load of a candidate server.

5. The method of claim 1, wherein the determining, by the processor, of the destination server is further based on a candidate destination server belonging to a failure domain.

6. The method of claim 1, wherein the determining, by the processor, of the destination server is further based on load on a candidate destination server.

7. The method of claim 1, wherein the partial repairs of the lost data is based on a scalar multiplication of local chunk data by a decoding coefficient.

8. The method of claim 1, wherein the completed repair of the lost data on the destination server comprises an aggregate XOR operation between results of partial repairs of the lost data.

9. The method of claim 1, wherein the indication of data loss is based on a degraded read.

10. The method of claim 1, further comprising scheduling, by the processor, the completed repair of the lost data based on input output (IO) read time of the destination server.

11. A computer readable storage medium associated with repair of storage, the computer readable storage medium comprising computer executable instructions that when executed by a computing device cause said computing device to effectuate operations comprising: detecting by a first server a data loss in storage of a second server;
   responsive to receiving the indication of data loss,
      determining a destination server to host a completed repair of the lost data; and
      determining a set of servers to do partial repairs of the lost data, wherein the partial repairs of the lost data is based on a scalar multiplication of local chunk data by a decoding coefficient; and
      coordinating, instructions to do the completed repair of the lost data on the destination server based on a combination of the partial repairs.

12. The computer readable storage medium of claim 11, wherein the partial repairs of the lost data occurs at approximately the same time.

13. The computer readable storage medium of claim 11, wherein the determining of the set of servers for partial repairs is further based on availability of data chunks required for partial repair of the lost data.

14. The computer readable storage medium of claim 11, wherein the determining of the set of servers for partial repairs is further based on load of a candidate server.

15. The computer readable storage medium of claim 11, wherein the determining of the destination server is further based on a candidate destination server belonging to a failure domain.

16. The computer readable storage medium of claim 11, wherein the determining of the destination server is further based on load on a candidate destination server.

17. The computer readable storage medium of claim 11, wherein the completed repair of the lost data on the destination server comprises an aggregate XOR operation between results of partial repairs of the lost data.

18. An apparatus associated with repair of storage, the apparatus comprising:
   a processor; and
   a memory coupled with the processor, the memory comprising executable instructions that when executed by the processor cause the processor to effectuate operations comprising:
   detecting an indication of data loss in storage of a first server:
   responsive to receiving the indication of data loss,
      determining a destination server to host a completed repair of the lost data; and
      determining a set of servers to do partial repairs of the lost data, wherein the partial repairs of the lost data is based on a scalar multiplication of local chunk data by a decoding coefficient; and
      coordinating, instructions to do the completed repair of the lost data on the destination server based on a combination of the partial repairs.

19. The apparatus of claim 18, wherein the partial repairs of the lost data is based on a scalar multiplication of local chunk data by a decoding coefficient.

20. The apparatus of claim 18, wherein the completed repair of the lost data on the destination server comprises an aggregate XOR operation between results of partial repairs of the lost data.

* * * * *